US011113457B2

(12) United States Patent
White et al.

(10) Patent No.: US 11,113,457 B2
(45) Date of Patent: Sep. 7, 2021

(54) SYSTEMS AND METHODS FOR EXECUTABLE CONTENT AND EXECUTABLE CONTENT FLOW DISTRIBUTION

(71) Applicant: WISETECH GLOBAL LIMITED, Alexandria (AU)

(72) Inventors: Richard White, Alexandria (AU); Zubin Appoo, Alexandria (AU); Mikhail Sverdlov, Alexandria (AU)

(73) Assignee: WiseTech Global Limited, Alexandria (AU)

( * ) Notice: Subject to any disclaimer, the term of this patent is extended or adjusted under 35 U.S.C. 154(b) by 0 days.

(21) Appl. No.: 15/749,102

(22) PCT Filed: Jul. 29, 2016

(86) PCT No.: PCT/AU2016/050677
§ 371 (c)(1),
(2) Date: Jan. 30, 2018

(87) PCT Pub. No.: WO2017/020072
PCT Pub. Date: Feb. 9, 2017

(65) Prior Publication Data
US 2018/0225266 A1    Aug. 9, 2018

(30) Foreign Application Priority Data

Jul. 31, 2015   (AU) ................................. 2015903059
Aug. 17, 2015   (AU) ................................. 2015903312

(51) Int. Cl.
*G06F 17/00* (2019.01)
*G06F 40/154* (2020.01)
(Continued)

(52) U.S. Cl.
CPC ............ *G06F 40/154* (2020.01); *G06F 3/048* (2013.01); *G06F 16/84* (2019.01); *G06F 16/95* (2019.01);
(Continued)

(58) Field of Classification Search
CPC .... G06F 40/154; G06F 16/84; G06F 16/9577; G06F 16/95; G06F 3/048; G06Q 10/10; H04L 67/42
See application file for complete search history.

(56) References Cited

U.S. PATENT DOCUMENTS 10,572,952 B1 *   2/2020   Wang ................... G06Q 40/123
2005/0096019 A1 * 5/2005   Ndili ........................ H04L 29/06
                                                                      455/414.1
(Continued)

OTHER PUBLICATIONS

PCT International Search Report and Written Opinion, PCT/AU2016/050677, dated Sep. 8, 2016, 9 Pages.
(Continued)

*Primary Examiner* — Laurie A Ries
(74) *Attorney, Agent, or Firm* — Fenwick & West LLP

(57) ABSTRACT

Disclosed are systems and methods for platform-agnostic executable content delivery. Also, disclosed are systems and methods at the device, processing a request to a remote server, the request for a form flow process file having a unique identifier, the form flow process file configured to provide access to executable forms, a request to the server including information of the rendering language of the device, which when different from that of the executable form stored at the server, is converted to the rending language of the device. Also disclosed are systems and methods of a device, including at the device, receiving a form flow process file and at the device, accessing a first form of the form flow process file from the server, the first form rendered in the language of the device. In this way, up-to-date executable content can be made available as the form flow requires.

12 Claims, 16 Drawing Sheets

(51) Int. Cl.
*G06F 16/84* (2019.01)
*G06F 16/957* (2019.01)
*G06F 3/048* (2013.01)
*G06Q 10/10* (2012.01)
*G06F 16/95* (2019.01)
*H04L 29/06* (2006.01)

(52) U.S. Cl.
CPC ......... *G06F 16/9577* (2019.01); *G06Q 10/10* (2013.01); *H04L 67/42* (2013.01)

(56) References Cited

U.S. PATENT DOCUMENTS

| | | | |
|---|---|---|---|
| 2007/0067373 A1 | 3/2007 | Higgins et al. | |
| 2007/0250783 A1 | 10/2007 | Wu et al. | |
| 2008/0184102 A1* | 7/2008 | Selig | G06F 17/243 |
| | | | 715/234 |
| 2008/0215966 A1 | 9/2008 | Suarez | |
| 2008/0244091 A1* | 10/2008 | Moore | H04L 67/2838 |
| | | | 709/246 |
| 2008/0244560 A1* | 10/2008 | Neagu | G06F 8/70 |
| | | | 717/174 |
| 2008/0293395 A1 | 11/2008 | Mathews et al. | |
| 2012/0311275 A1* | 12/2012 | Muramatsu | G06F 11/201 |
| | | | 711/154 |
| 2013/0097479 A1 | 4/2013 | Zavaleta et al. | |
| 2014/0075413 A1 | 3/2014 | Binjrajka | |
| 2014/0122544 A1* | 5/2014 | Tran | G06F 21/10 |
| | | | 707/825 |
| 2015/0020177 A1* | 1/2015 | Shmulevich | G06F 40/134 |
| | | | 726/6 |

OTHER PUBLICATIONS

European Patent Office, Extended European Search Report and Opinion, EP Patent Application No. 16831966.3, dated Feb. 27, 2019, seven pages.

* cited by examiner

Fig. 13

TRANSPORT BOOKING Pickup Details

YOU ARE IN CONFIGURATION MODE (changes to job will not be saved)

Booking Party

- Company Name
- Address
- Address 2
- Postcode | City
- State | Country Code

Bill To Party

- Company Name
- Address
- Address 2
- Postcode | City
- State | Country Code

Consignment Details

- Service Level
- Refrigeration required: Yes | No
- Dangerous Goods: Yes | No
- Customer Order Number △ Additional Fields
◁ Requested From
◁ Requested To
△ Additional Panels There are currently no additional panels to display

Pickup Address

- Company Name
- Address
- Address 2
- Postcode | City
- State | Country Code

Pickup Details
Pickup Instructions ( Cancel ) ( Save Configuration & Close ) ( Save Configuration ) ( Pickup Request ) ( Delivery Details )

Fig. 15

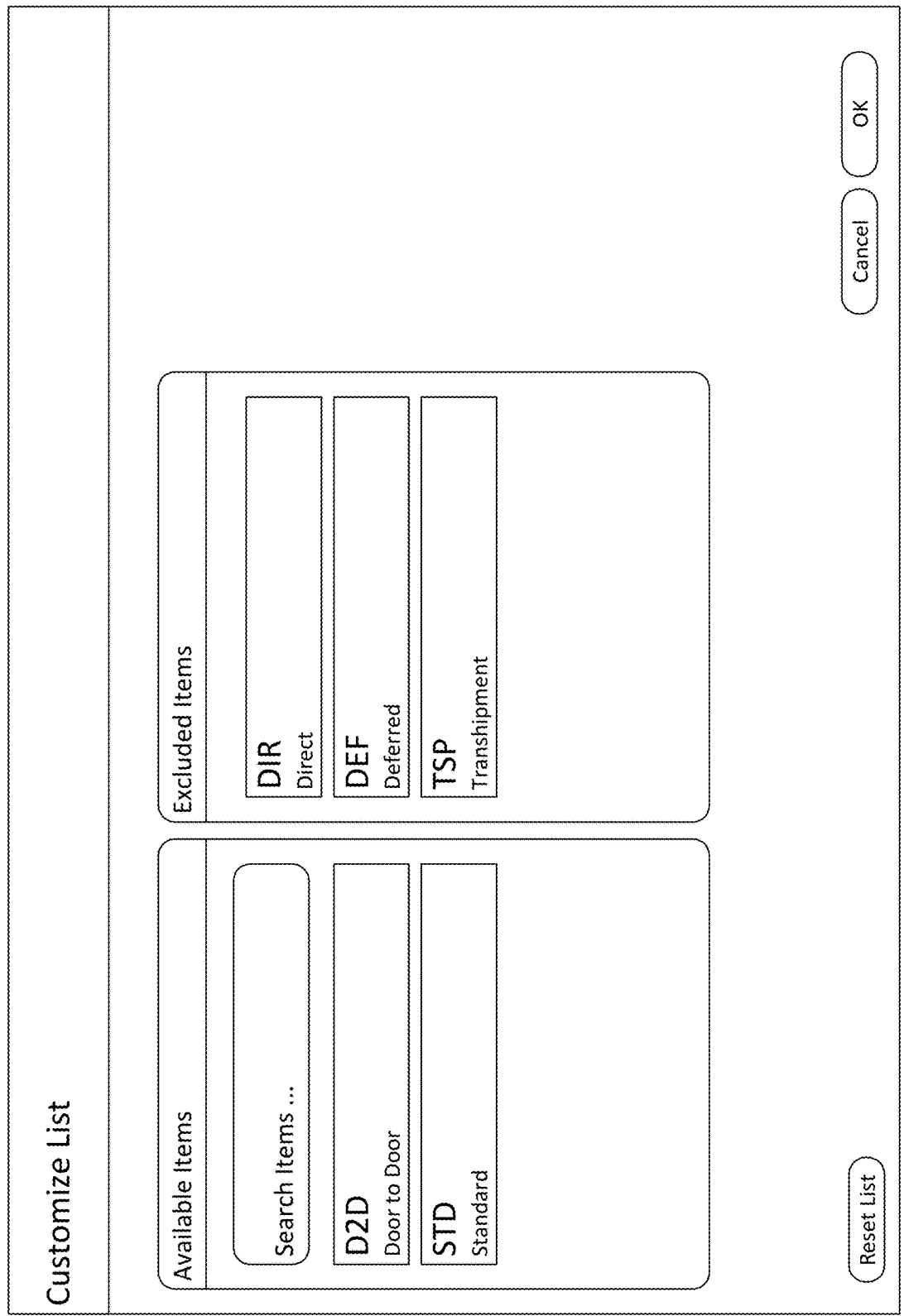

SYSTEMS AND METHODS FOR EXECUTABLE CONTENT AND EXECUTABLE CONTENT FLOW DISTRIBUTION

CROSS-REFERENCE TO RELATED APPLICATIONS

The present application claims priority from Australian Provisional Application No 2015903059 filed on 31 Jul. 2015, the contents of which are incorporated herein by reference.

The present application claims priority from Australian Provisional Application No 2015903312 filed on 17 Aug. 2015, the contents of which are incorporated herein by reference.

TECHNICAL FIELD

Disclosed are platform-agnostic systems and methods for executable content and executable content flow distribution.

BACKGROUND

On a "native" device such as a table, phone or laptop computer, content can be rendered by a browser or in a native rendering language. A web application will rely on a browser (rendered in HTML) and its capabilities to render the application, whereas a native mobile application will rely on the device and its native capabilities to render the application (using, for example, Objective C, Java or Silverlight). Web applications, particularly those that involve executable features, which are delivered through a browser can be slow, unresponsive and feel much less functional than a native application.

Forms are an example of executable content typically delivered through a browser. Executable means the input or interaction, either of a user or remote input, either pulled or pushed can cause an output to occur. An example of executable content is an executable form item that represents form logic. For example, when a form item field is filled in by a user or other means, data is delivered to a server as output. Other examples can include selecting an option where when selected, an output occurs such as a user's choice is provided to a server. Multiple executions can occur. For example data can be saved to a server, and another executable form item can be displayed or the path through subsequent content to be followed is delivered. The particular output that occurs as a result of the execution can include any type of output. For example, input or interaction with executable content can lead to generation or display of non-executable content such as an alert or some data being sent to an external system.

Particularly when utilizing a string of forms on a browser, the slowness and unresponsiveness can provide for a poor user experience, and potentially incomplete or failed transactions. However, while more agile, native applications must be delivered in the native rendering language which requires programming applications in a plurality of languages so that they are available on a plurality of native device platforms. Therefore, applications must be written in different rendering languages so that they are available for use on different types of native devices as well as HTML if also intended to be rendered on a browser. Since forms in particular are interactive, it would be preferable that they run as native applications on native devices. However, they can also run on browsers.

In most, systems, forms and the forms flow that determine the forms' order or sequence are created by a system supplier and are customized for a particular customer. Form flows can include many forms and can include many logic controls to guide a user through the order or sequence. Customization for a particular purpose makes updating or adding forms to the executable content a lengthy and expensive task. Moreover, the system as a whole usually is required to be duplicated for each of the device platform types. When a device downloads an application, the executable content, and in particular, executable forms, are typically delivered in their entirety since they have been preprogrammed for the native device in its rendering language. The preprogrammed forms are then stored on the device, which takes up space and can increase the demand on the performance of the device. Not only does preprogrammed forms and form flow require a different version of the application for each operating system and/or hardware type and thus multiply development effort, preprogramming potentially leads to different experiences on each device.

SUMMARY

There is a need to deliver forms and other executable content from a server to a device so that the forms can be accessible and rendered in the rendering language of the native device or in the language of a browser without the need to write different source code for each form. There is also a need to provide for a device to be able to receive up-to-date executable content and to avoid the lag time between the time of the need to update the executable content and the time of its eventual preprogramming for each type of native device.

Disclosed are systems and methods for platform-agnostic executable content delivery. Also, disclosed are systems and methods at the device, processing a request to a remote server, the request for a form flow process file having a unique identifier, the form flow process file configured to provide access to executable forms, a request to the server including information of the rendering language of the device, which when different from that of the executable form stored at the server, is converted to the rending language of the device. Also disclosed are systems and methods of a device, including at the device, receiving a form flow process file and at the device, accessing a first form of the form flow process file from the server, the first form rendered in the language of the device. In this way, up-to-date executable content can be made available as the form flow requires.

Disclosed are systems and methods for platform-agnostic executable content delivery, executable forms being an example of executable content and described in particular. Also disclosed are methods and systems for on a server, storing a form flow process file, the form flow process file configured to provide access to form files, receiving at the server, a request from a device for the form flow process file and transmitting the form flow process file to the device. Also disclosed are methods and systems of a device having a form factor and a display, wherein device operates in accordance with a rendering language native to the device, including at the device, receiving instruction to request a form file and transmitting a request to a remote server, the request for a form flow process file which is configured to provide access the form file and receiving the form flow process file from the server. Also disclosed are methods and systems for on a server, storing form flow process file configured to provide access to a form file and on the server, storing the form file, the form file configured in a first rendering language, receiving at the server, a request from a device having access to the form flow process file, the request for the form file and an indication of the rendering language requirements of the device. At the server, determining whether the first rendering language meets the rendering language requirements of the device, and wherein if the first rendering language does meets the rendering language requirements of the device, transmitting the form in the first rendering language. Also disclosed are methods and systems wherein if the first rendering language does not meet the rendering language requirements of the device, converting the form file into the rendering language requirements of the device and transmitting the converted form. Moreover disclosed are methods and systems for on a server, storing an form flow process file and on a graphical user interface of a device remote to the server, the device having a form factor, the device receiving instructions to request a form flow process file from the server and the device transmitting the request to the server and an indication of the form factor of the device at the server, receiving the request and at the server, transmitting the form flow process file. Additionally disclosed are systems and methods of a device and server, including on a graphical user interface of a device remote to a server, receiving instructions to request a form flow process file from the server and a request for a form file, the request including information identifying the rendering language of the device and receiving by the device a form flow process file and an form file being configured for rendering by the device in accordance with the rendering language of the device. Also disclosed are systems and method of at a server, storing an executable content flow process file and an associated executable content file in a first rendering language, receiving a request from a remote device to transmit an executable content flow process file and transmitting the executable content flow process file and at the server, receiving a request for the associated executable content file of the executable content flow process file, the request including an indication of the rendering language of the remote device and at the server, converting the executable content file from the first rendering language to a the rendering language of the remote to generate a converted executable content file for use on the graphical user interface of the remote device and at the server, transmitting the converted executable content file.

BRIEF DESCRIPTION OF DRAWINGS

FIG. 13 shows an example of the form designer surface.

FIG. 15 shows a form-flow in configuration mode.

FIG. 16 d how a search control can be configured.

DESCRIPTION OF EMBODIMENTS

Disclosed are methods and systems for delivery of executable content, in particular forms, which can be provided in a modular way. That is, where what is needed by way of the form flow is delivered by the use of flow form process files and delivery of forms based upon the flow form process files. In this way, up-to-date executable content can be made available as the form flow requires.

For context, below, is an inserted description of systems and methods for executable content and executable content flow creation. While this disclosure is not directed to the manner in which forms are created and which form flows are created, the disclosure below provides a context to understand the concept of form flow process files. The forms creation aspect of the inserted description provides a manner in which to build forms and change forms. In this way, forms can be up-to-date. Also the manner in which forms are associated with a form flow process file is also described. The flow form process file creation provides the ability to organize the forms in a flow process file so that forms are accessible during the flow form process. As the inserted description provides, the forms are separately stored from the form flow process files. In this way, the forms can be updated without involving the form flow process files. Delivered forms therefore can be up-to-date forms without the need for recoding and updating each form in different application languages.

Figure 1:
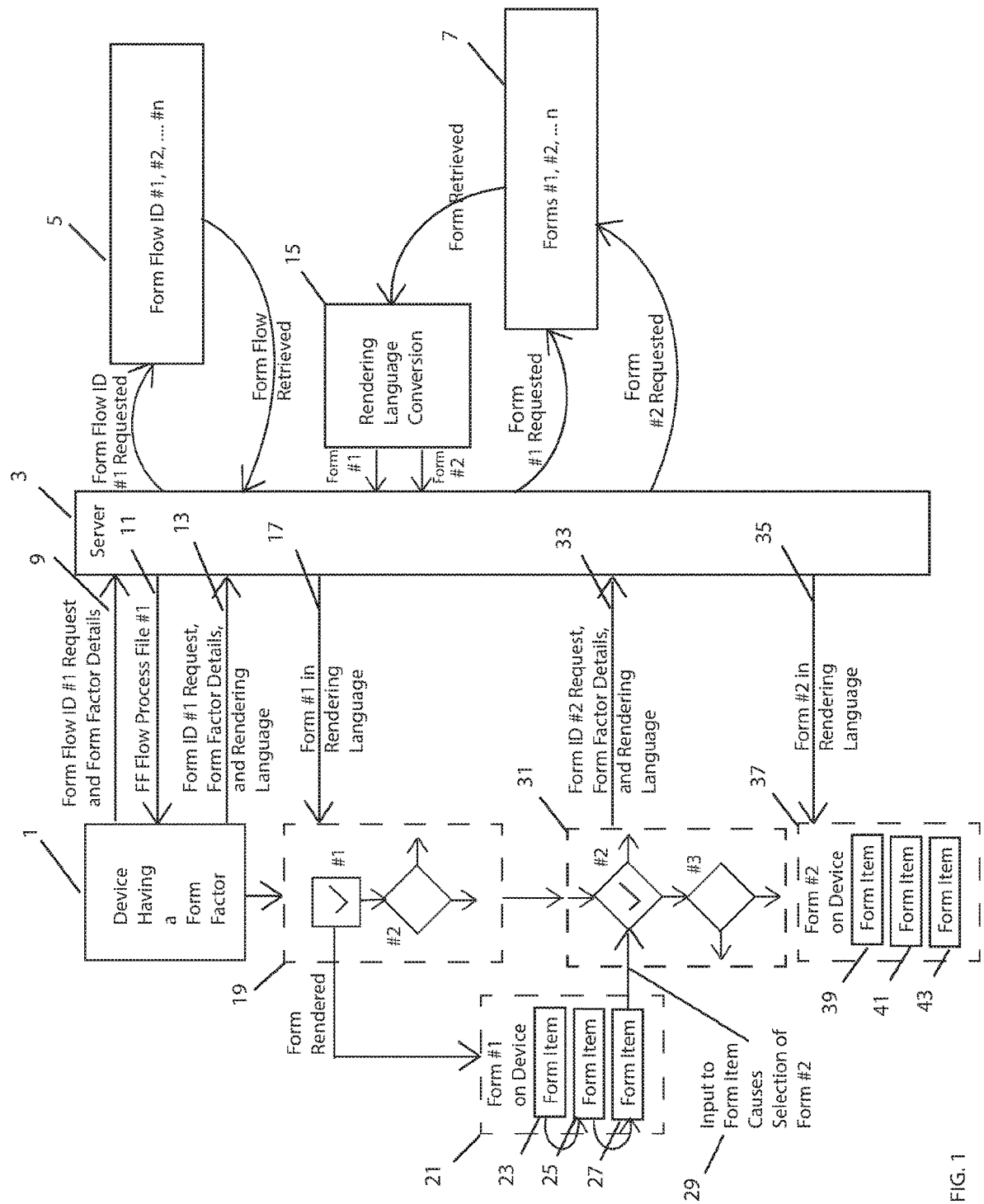
FIG. 1 depicts the methods and systems for delivery of executable content, in particular forms.

FIG. 1 depicts the methods and systems for delivery of executable content, in particular forms, which can be provided in a modular way. FIG. 1 depicts a device 1 which can be a mobile device, a desktop device or any other type of rendering device that is remote to a server 3. Such a device can be equipped with memory for storing and a transceiver for receiving and transmitting. A device can include a graphical user interface, for example, with a touch screen, for receiving instructions from a user, or other means such as voice control. A device can be in wired or wireless communication with a server or a plurality of servers.

The device 1 has a form factor such as that of a mobile device such as a smartphone, a table or a desktop device. The form factor information and the rendering language information can be stored in a memory of the device. The server 3 is remote to the device, or can be directly accessible to the device. The server 3 has access to storage 5 of flow form process files and storage 7 of forms.

The user of a device may have on the device a list of available form flow process files or such a list may be provided dynamically. On the other hand, one form flow process file may be accessible to a user. Availability of form flow process files could be dependent upon the situation, the commercial needs or the access to a remote server. The server, while depicted as a single server, can be a collection of two or more servers. For example, one may store the form flow process files and another may store the form files, with a third may provide the rendering language conversion engine capability. The server can include other computing capabilities for carrying out the disclosed methods.

Means such as means for storing a form flow process file include memory capabilities of a server. Means such as means for receiving a request by the server include wired and wireless means such as a transceiver. The same is the case for transmitting. A device, such a mobile device that operates in accordance with a rendering language native to the device, the means for receiving an instruction could be via a graphical user interface, voice commands or other suitable input devices or processes of the native device. When a form flow process file is stored, in one embodiment, temporarily, and/or just a portion of it, in the memory of a device, a form may be presented to a user, thus the form flow process file provides access to a form file. In such a case, the device may transmit a request to the server for the form file so that the form file may therefore be presented. When the form file is delivered this way, it is possible for the form file to be the most up-to-date form.

A form flow process file can be presented in any suitable manner. It may be an icon on a graphical user interface, or part of a drop down menu that may have a plurality of form flow process files indicated. When the form flow process file is opened, a first form may be presented to the user on the graphical user interface or some other output method.

A user may manually provide instructions or the device automatically provide instructions to the device to transmit a form flow ID request along with form factor details of the device. Referring to FIG. 1, the transmission of a form flow ID #1 request and form factor details signal 9 is depicted. The server 3 can receive the signal 9 and access the storage 5 for a flow form process file. The form flow process file #1 can then be transmitted 11 by the server 3 and the device 1 can receive it.

A form flow process file can include mapping to a plurality of forms. Typically, the first form in the form flow process file is the form accessed initially. Therefore, the device can transmit a request 13 for form ID #1 and include the form factor details and the rendering language of the native device. The transmission of signals 11 and 13 can occur in the background. The device would have transmitted signal 9 and signals 11 and 13 could have followed. In the event, for example, that a user was partially through a form flow process file and then did not complete the process, the form ID may not be #1, but a different form in the flow form process, depending upon the circumstances.

A form when stored in storage 7 is stored in a particular language. The language can be for example, XAML. As discussed above, different devices render in different languages. Common rendering languages are XAML, JSON and HTML. When a form is retrieved from storage 7, as in this example, form #1, the form may need to be converted to a native device language which would have been indicated in transmission 13. If it does need conversion, it can be converted by a rendering language conversion engine 15. Conversion at delivery allows for the most up to date form stored in storage 7 to be delivered to device 1. Since forms can be updated in accordance with the form creation and form flow creation methods and systems described below and are stored separately in storage 7 from form flow process files in storage 5, forms can be up to date for the rendering language conversion just prior to deliver to device 1 via signal 17.

The conversion process can take the 'source form', which is stored in XAML, and replace each part of that XAML form with the equivalent version of that 'part' in the relevant language. In one example, individual pieces of code are specifically mapped in three languages—XAML, HTML and JSON. In this example, there is a 1-1 mapping between these three languages. By analyzing the three languages, it is possible to establish a close mapping between the three.

The mapping repeats for each 'part' of the form, resulting in a complete form in the new language. The client native device has been programmed to operate based on one of multiple languages (XAML, HTML, or JSON). The native client device can then render the application in this language. Microsoft Windows desktops will use XAML. HTML browsers will use HTML. Native applications (iOS, Android, Windows Phone, Windows Surface) may either use HTML or another native language. Windows CE/Mobile devices will use JSON to display the user interface.

Still referring to FIG. 1, device 1 is depicted in phantom to illustrate various states of the device. The device 1 is depicted in phantom 19 upon receiving form #1 in the device rendering language and providing access to form ID #1. The box labelled #1 has been checked to indicate that form having ID #1 is accessed. In phantom 21, device 1 is shown as rendering the form #1 so that form items are rendered on the device 1. As a user utilizes the form #1 on device 1, form items 21, 23 and 25 are presented. The form items 23, 25 and 27 are, for example, executable form items. Input to form item 27 causes selection of a form having ID #2.

When the device receives instructions from a user or otherwise, for example, automatically, in accordance with a form item, for example form item 23, the execution of the form item may cause the form flow process to initiate a different branch in the form flow. For example, the different branch may require a different form, such as form #2. The box labelled #2 has been checked to indicate that form ID #2 is to be accessed. The device 1 is depicted in phantom 31 having received instruction to request form ID #2. The request 33 can include form factor details and rendering language details 33.

As described above, when a form is retrieved from storage 7, as in this example, form #2, the form may need to be converted to a native device language which would have been indicated in transmission 13 and/or 33. If it does need conversion, it can be converted by a rendering language conversion engine 15. Conversion at delivery allows for the most up to date form stored in storage 7 to be delivered to device 1. Since forms can be updated in accordance with the form creation and form flow creation methods and systems described below and are stored separately in storage 7 from form flow process files in storage 5, forms can be up to date for the rendering language conversion just prior to deliver to device 1 via signal 35.

In phantom 27, device 1 is shown as rendering the form #2 so that form items are rendered on the device 1. As a user utilizes the form #1 on device 1, form items 39, 41 and 43 are presented. The form items 39, 41 and 43 are, for example, executable form items. The process can continue so that the form flow process is complete, depending upon the circumstances.

Figure 2:
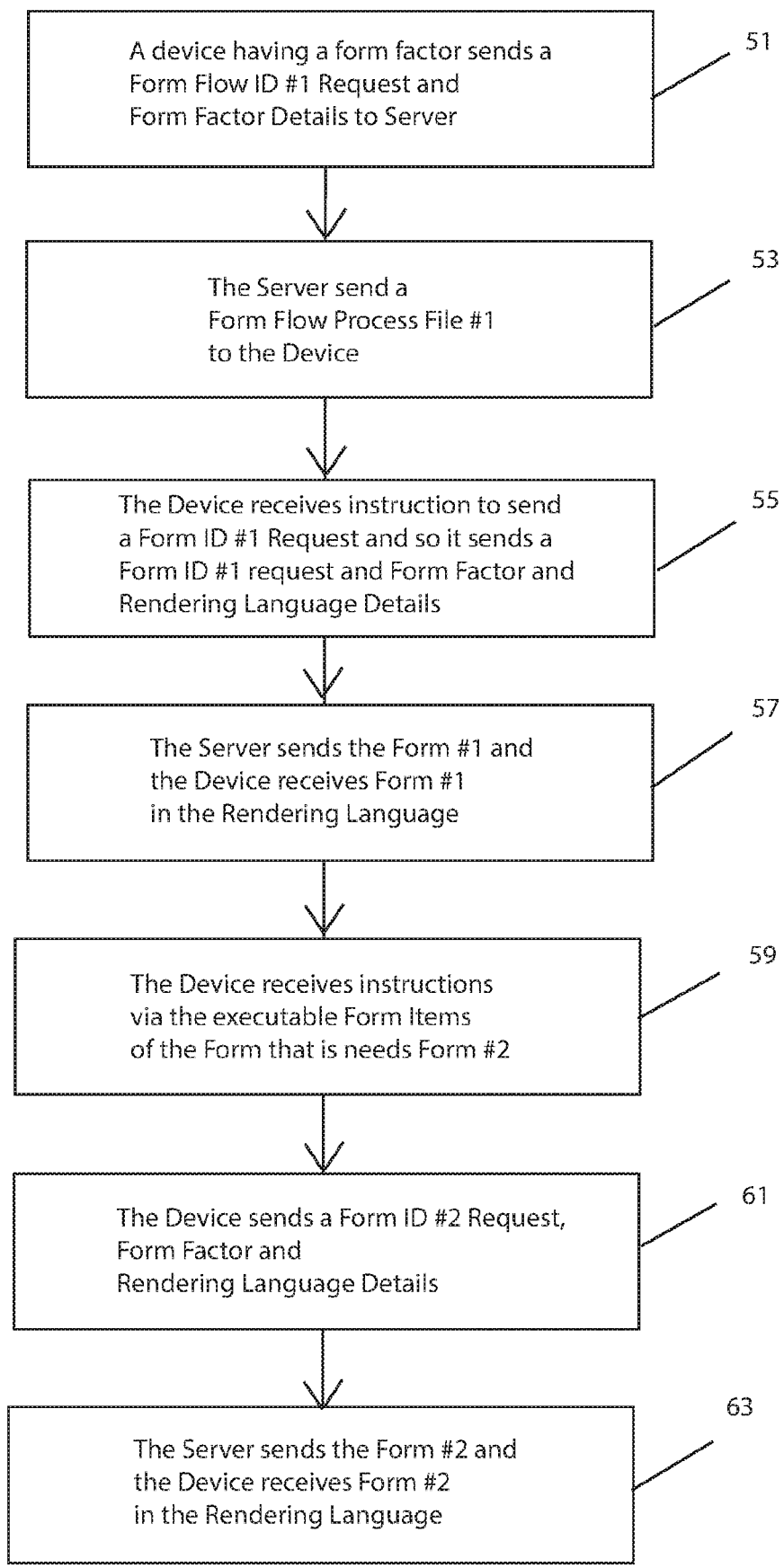
FIG. 2 is a flow chart depicting a process the can include the disclosed methods and systems.

FIG. 2 is a flow chart depicting a process the can include the disclosed methods and systems. A device having a form factor sends 51 a form flow ID request and form factor details to a server 51. The server can send 53 a form flow process file. The device receives instructions to send a form request and so it can send 55 a form ID and form factor and rending language details. The server can send the form and the device can receive 57 the form in the rendering language. The device can receive instructions 59 via an executable form item if the form that it needs a different form. The device can send 61 a form ID as a request as well as the form factor and the rending language details. The server can send 63 the next form in the rendering language.

Below is the inserted description provides methods and systems of form creation and form flow process files creation referred to above. Is it understood that the discussion below is not intended to limit the scope of form creation and/or form flow process file creation.

The disclosed systems and methods enable creating executable content and content flows without programming. For example, executable content can include interactive content. In one embodiment, content is forms, and content flows is form flows. In this disclosure, executable content will refer to executable forms. Nothing in this discussion is intended to limit content to forms however, the forms embodiment provide a ready illustration of the disclosed systems and methods.

The disclosed systems and methods enable the creation of executable form and form flows and, for example, can use the relationships between a central server, a designer device, and a user device to create, store, and transmit the created content and content flows in a lean computing environment. The created forms and form flows are useful in any environment, business lines, or systems in which a form is used. Generally, the disclosed systems and method provide visual layouts that represent form logic so users can visually or graphically create the form and form flow without needing to code computing language to create the form or form flow.

Logistics of transporting goods and freight is an example of an industry that requires many forms because is it a highly regulated global industry. When regulations change, forms and form flows often need to change. The disclosed example forms and forms flow systems and methods can function in a freight logistics environment. One of skill in the art will appreciate that the forms and form flows methods and systems disclosed here could be applied in any environment or system that uses or requires a form and even more broadly, the disclosed systems and method can apply anywhere that executable content and content flows are used.

Figure 3:
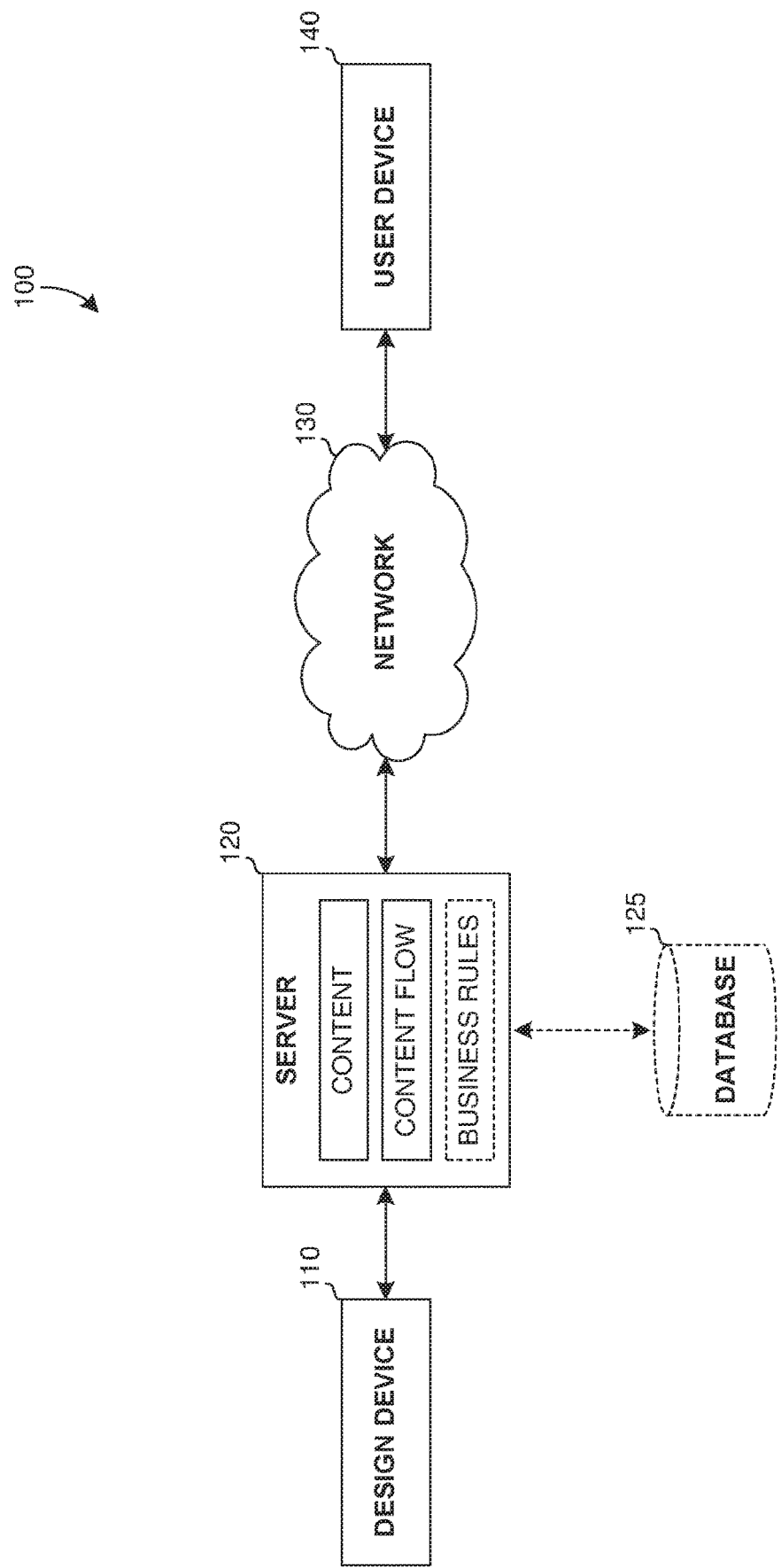
FIG. 3 is an example content and content flow system.

As mentioned, the described executable content can be of various types, including interactive content that can require user input, of which forms are a type of executable content. More particularly, this discussion will focus on executable forms as the executable content. FIG. 3 is an example of an executable form and form flow creation system 100. Forms can be designed on a design device 110 and stored on a server 120. Any other system configuration that provides the functionality to carry out the disclosed methods are within the scope of this discussion. The design device 110 is also used to create the form flow, which is also stored on the server 120. As mentioned, the form flow is the order in which various forms are accessed during a user device 140 requested process execution. The form flow is the logic underlying the display of form items to a user based on a user's interaction with the forms in the form flow.

Ultimately when the process of form and form flow creation is complete, during execution of the form flow on the user device 140, the form flow is retrieved from the server as required by the user. The forms of the form flow are delivered as the forms are required during execution of the form flow on the user device. If server/network access is limited, forms can be stored on the user device 140. Both the forms and the form flow(s) can be stored on the same server 120 as shown in FIG. 3, or alternatively, could be stored separately from one another as could be done in a distributed system such as a cloud-based computing system. Since the form and the form flows exist separately, there is not a requirement that the two be stored on the same server or system.

As form flow determines a sequence, order and/or arrangement or other configuration of displayed related forms, form flow can be visualized as a flow chart. The form flow can include flow elements such as "if" conditions, switch conditions, while loops, jump/go-to statements, decision statements, confirmation messages and other flow elements. The form flow defines a logical pathway by which one or more the related forms is accessed. Responses or rules regarding user inputs and interactions can be included in the form flow to be used to determine the subsequent content to retrieve and/or display. User input or interaction may not be required in the form flow in certain situations, such described above. The input and interaction can include the retrieval of information from a user device, a database, an intranet or the Internet. Such input can include, for example, GPS data or ambient sensor readings.

A design or designer device 110 can be used to create a form and form flow which can be stored on a server 120 for use by a user device 140. Any other configuration of a design device is within the scope of this discussion. For example, a design device can be more than one device, for example, where multiple parties are contributing to the content of content flow.

Figure 4:
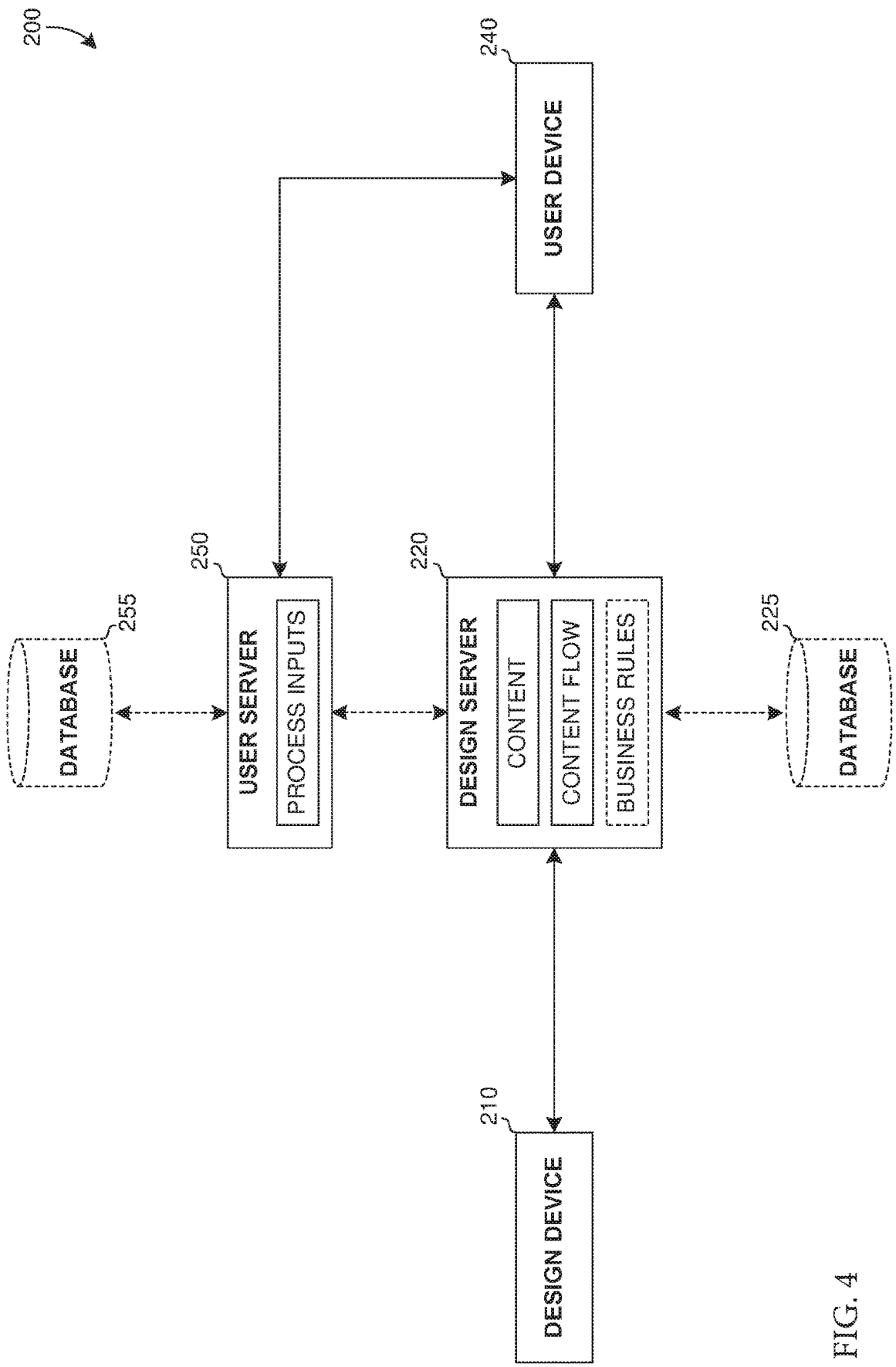
FIG. 4 is another example content and content flow system.

FIG. 4 is another example form and form flow system 200. In this example, the user process inputs can be transmitted by the user device 240 to a user server 250. The user server 250 can communicate with a database 255 where the process inputs can be stored and/or other information is stored. Process inputs would include the data that is inserted into a field, pulled or pushed. For example, were the field for "Booking Party" the process input could be "Joe's BBQ" (see FIG. 4, item 421). If the field were for "Transport Company" the process input could be "Frank's Freight". The user server 250 can receive the process inputs and compare or process them using information or tools stored on the connected database 255.

To illustrate the many system variations, FIG. 4 shows the design server 220 and the optional database 225 which can be similar in nature and function to the server 120 and database 125 of FIG. 3. In the example shown in FIG. 4, the user device transmits content inputs to a user server 250, so the design server 220 can function as purely a design server, containing the content, content flow, business rules and other content related items the user device may require to complete a selected task.

In the form and form flow system 200 of FIG. 4, the design device 210 is used to create form and form flows which are stored on a design server 220. The user device 240 can request a process from the design server 220 and will receive form and form flow. The design server 220 can also include business rules. A database 225 can also communicate with the design server 220. The database 225 can include other executable content, business rules or other information. The various elements of the form and form flow system 200 of FIG. 4 or any other system configuration can communicate between each other using network or other electronic communication protocols or methods.

Figure 5:
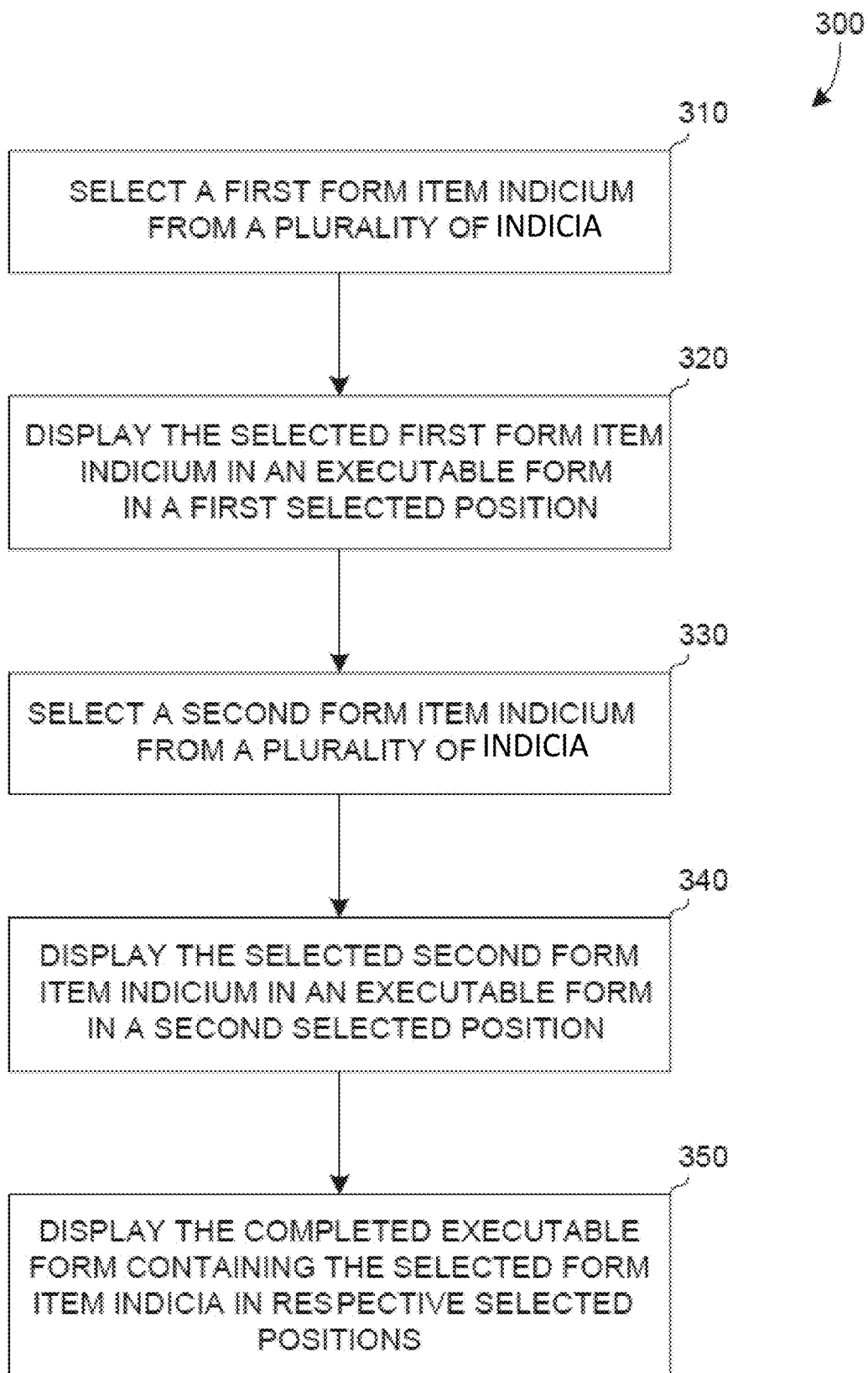
FIG. 5 is an example form creation process.

FIG. 5 depicts a form creation process 300. A form designer selects a first form indicium from a provided list, or plurality, of form indicia 310. A form indicium (pl. indicia) can be a form element, such as an input box or other interactive content. The first form indicium is placed and positioned by the designer 320 in the form view 420 (see FIG. 6) of the designer device or other suitable system. For example, the indicium is dragged from a list into the form view. When, for example the indicium is clicked, dragged or placed, the system inserts a code making the form item executable in the form. Other actions other than clicking, dragging or placing may cause the code to be linked or bound to the selected form item. Any other manner of positioning form items for inclusion in a form is within the scope of this discussion, particularly those utilized in a user graphical interface. The click and drag method described here is a common user interface method. A second form indium can be selected 330 and placed and positioned within the form view 420. The process of selecting and placing a form indicium can be repeated until the desired indicia are included within the form view 420. Once the form in the form view is complete 350, the designer can view the completed form and the various indicia and their positions within the form view 420.

Figure 6:
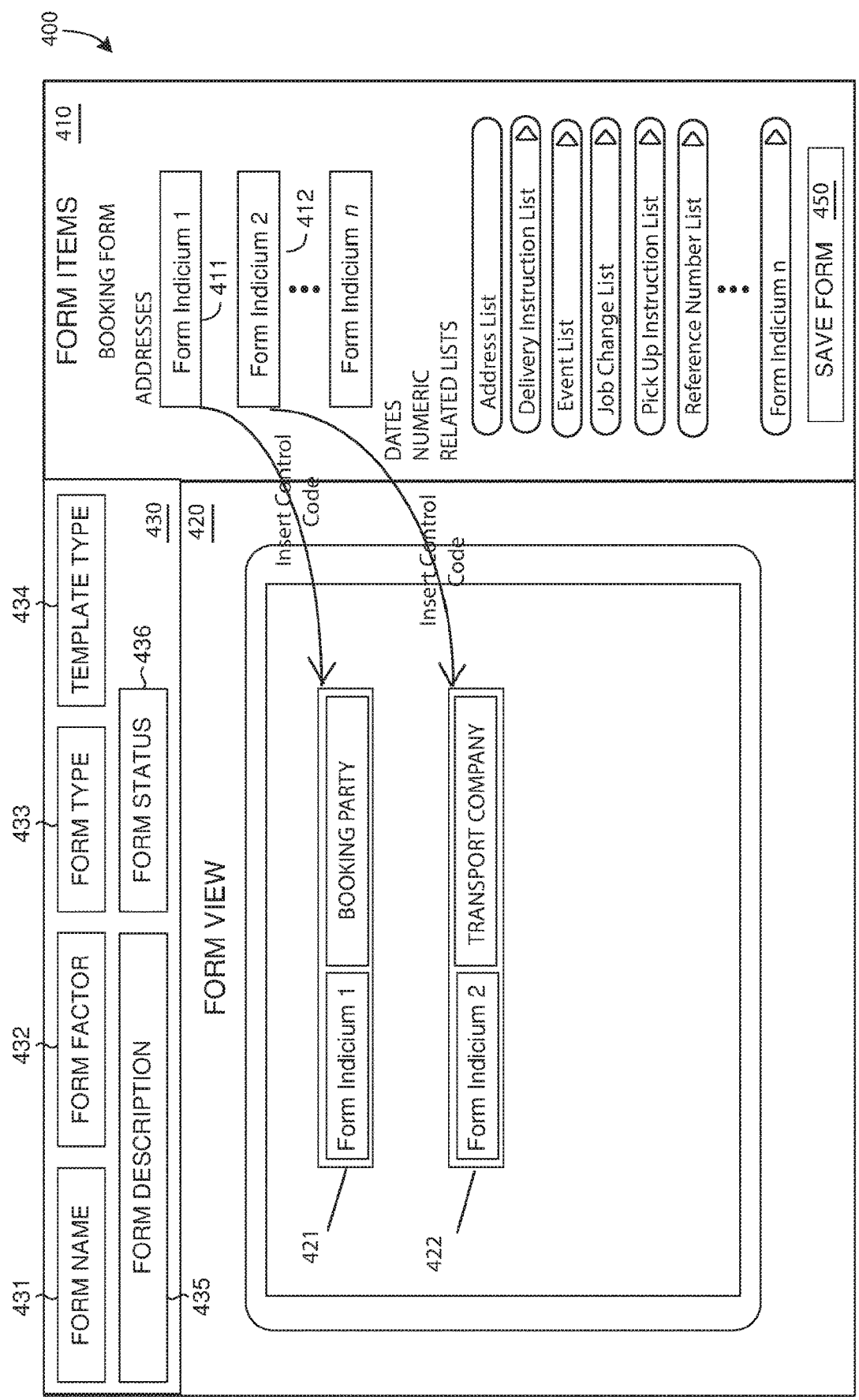
FIG. 6 is an example form creation interface where control code is inserted.
Figure 7:
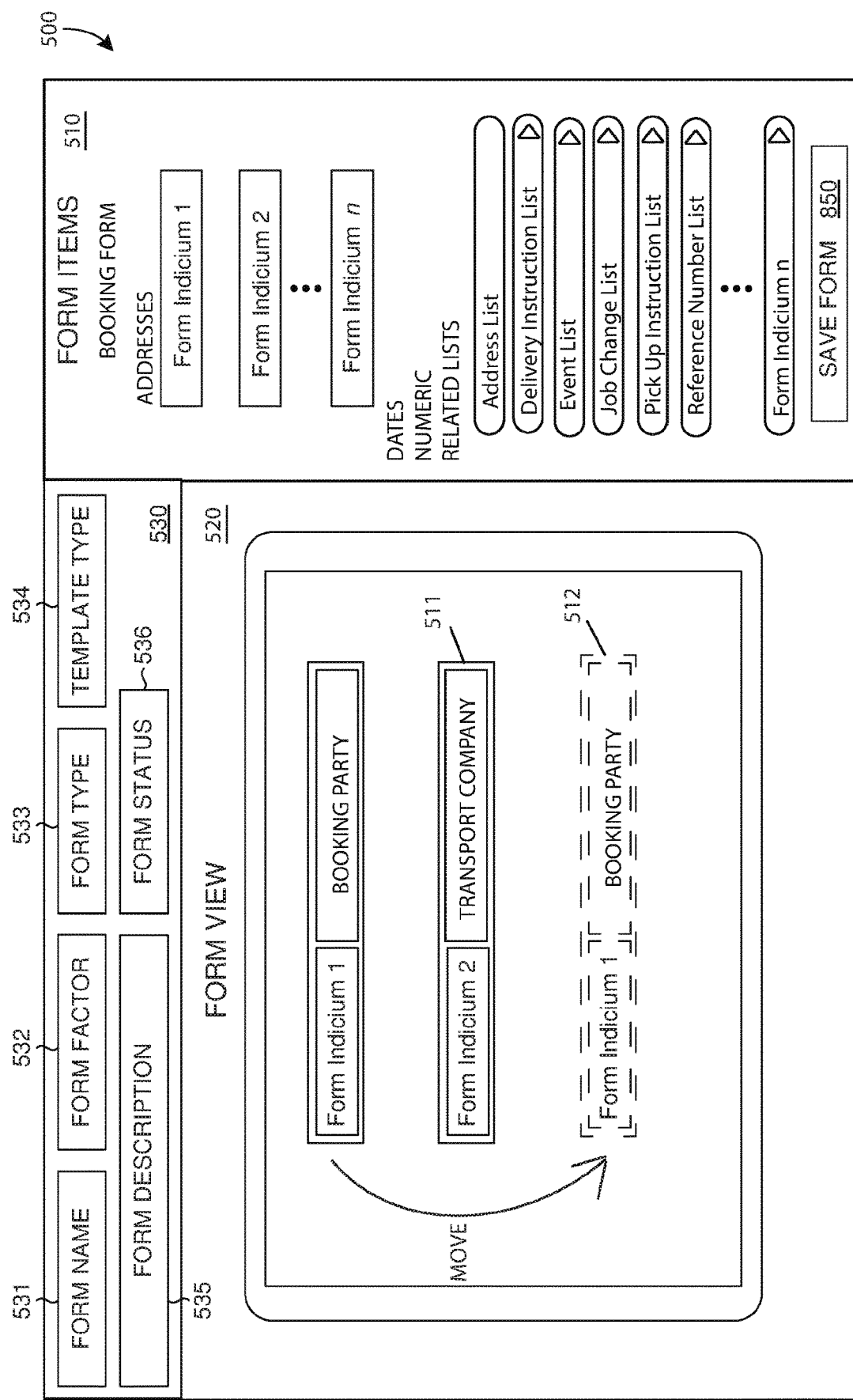
FIG. 7 is an example form creation interface utilizing form creation features.

Now referring to FIG. 7, when the user clicks, drags or places a field from the form item list 410 onto a form view 420, the system will do thing things: (1) the system will determine what type of control to drop onto the form view 420 by using the mapping table below; and (2) the system will insert XAML for that specific control into the form's XAML that specifies a) the type of control and b) the field that is being inserted/dragged into the form (city, state, postcode etc.). Upon completion of the form, the XAML is serialized. Serializing means converting what is dragged onto the form view 420 (see FIG. 6) into a structure that can be stored in the database as text (XAML). Deserializing means reading that XAML from the database and reconstructing the form either for further designer modifications, or for preparation for execution.

| Mapping Table | |
|---|---|
| Data Type | Type of Control |
| String | Text box |
| String with list of choices | Dropdown |
| Date | Date picker |
| Time/Duration | Time picker |
| Boolean | Checkbox or Option button (in cases like this, the user has a choice) |
| Collection | Grid |
| Related entity | Search box |

As background, eXtensible Application Markup Language (XAML) is an XML based language used for defining user interfaces. Any other such language is within the scope of this discussion. Accordingly, when a form rendering engine reads the serialized form XAML it can determine how to interpret the executable form items to produce a form that can be executed. Below, this process and how to achieve it is explained. In this way, a user without concern about how the form item will function, in a single repeatable step, can build a form.

FIG. 7 depicts that as the disclosed systems and methods allow a user to drag fields from the form list 410 onto a form which is being created on the form view 420, the disclosed systems and methods will insert XAML that represents the relevant control into the form of a specific type which are 'linked' or bound to the dragged field. That is, the system recognize the data type and in the form view 420, inserts a control. Such a field is for example form indicium 1 and form indicium 2. When the user saves the form 450, serialization of all the controls into a single block of XAML will occur, and this block of XAML is saved to the database.

Converting what is dragged onto the form view 420 into a structure that can be stored in the database as text (XAML) requires creating a set of XAML extensions to control certain configurable options including, but not limited to, what caption to show for a field, whether it should be read only or allow input, whether a control that accepts the entry of an address should or should not show a 'country' field etc.

In this way, a user in one step arranges executable form items to generate an executable form. Due to 2(*b*) above (the field that is being inserted/dragged into the form (city, state, postcode etc.), the system determines what data to load from the data storage as forms in which users enter inputs or data that is captured and used elsewhere within the system, or what data to push to the data storage when the user enters it. Executable form items may not require user interaction. Rather, they can retrieve an input based on data stored or generated within a user device, such as a time stamp, a location or other user device data.

Another feature depicted in FIG. 6 refers to form factors. The form factor field 432 can be a list of selectable form factors which determine the user device display size, resolution and other parameters. The form factors define the area in which the designer can design the created form. Shown in FIG. 6 is a tablet form factor, however during the form building process, the form factor on the form view 420 can be changed to another form factor. Other form factors include a smartphone, computer screen or other common user device types. Selected form factors 432 can be used to determine the form view 420. Changing form factors can be achieved by a "form service" that provides conversion to the rendering in the required language—either in XAML, HTML or JSON (or whichever rendering language is utilised by a "native" device having particular form factor). In particular, creating a set of XAML extension for rendering on each device type can require ensuring that the form look nearly identical when it was run compared to when it was 'designed'. As mentioned, in the form view 420, the form factor can be changed.

To provide a one-step solution for a user to create an executable form and a form flow that would operate on different native platforms involves creating the mapping of data type to control type, and making the controls intelligent enough to understand those data types and the slight differences between them, creating the ability to have snippets for each control type in three languages, allowing multiple options on each control type (such as Width, Height, ReadOnly, Caption, TextWrapping, etc.)—and making these options work across all three languages in a near-identical way, and ensuring a near-identical user experience for each of the three language versions of each snippet. Making the controls intelligent enough to understand the data types when they are clicked, dragged or dropped onto the form view involves creating a shipper per control, per language. Each snippet then has a series of 'placeholders' within it, such as ~Width~, ~Height~etc. There is code behind each of the snippets, for each language, that dictate how each of those options is interpreted by the relevant language and platform.

Creating such a conversion set would require substantial careful work by a large team of programmers and then carrying out this large project required careful planning, exceptional productivity management and constant testing.

For each device, there is a form rendering engine. This engine knows how to render the form for the specific device. It either renders from XAML, HTML or JSON. First the client device requests the form from the form service. The form service converts the designed and stored XAML into the required language—either XAML, HTML or JSON. For each 'type of control' (textbox, date picker etc) there is a snippet of code that defines that control in each language—i.e. XAML, HTML and JSON. For example, when converting a XAML form to JSON, for example, each XAML control is replaced with the JSON equivalent. The result can be that a JSON form that looks nearly identical to the original designed XAML form.

Figure 8:
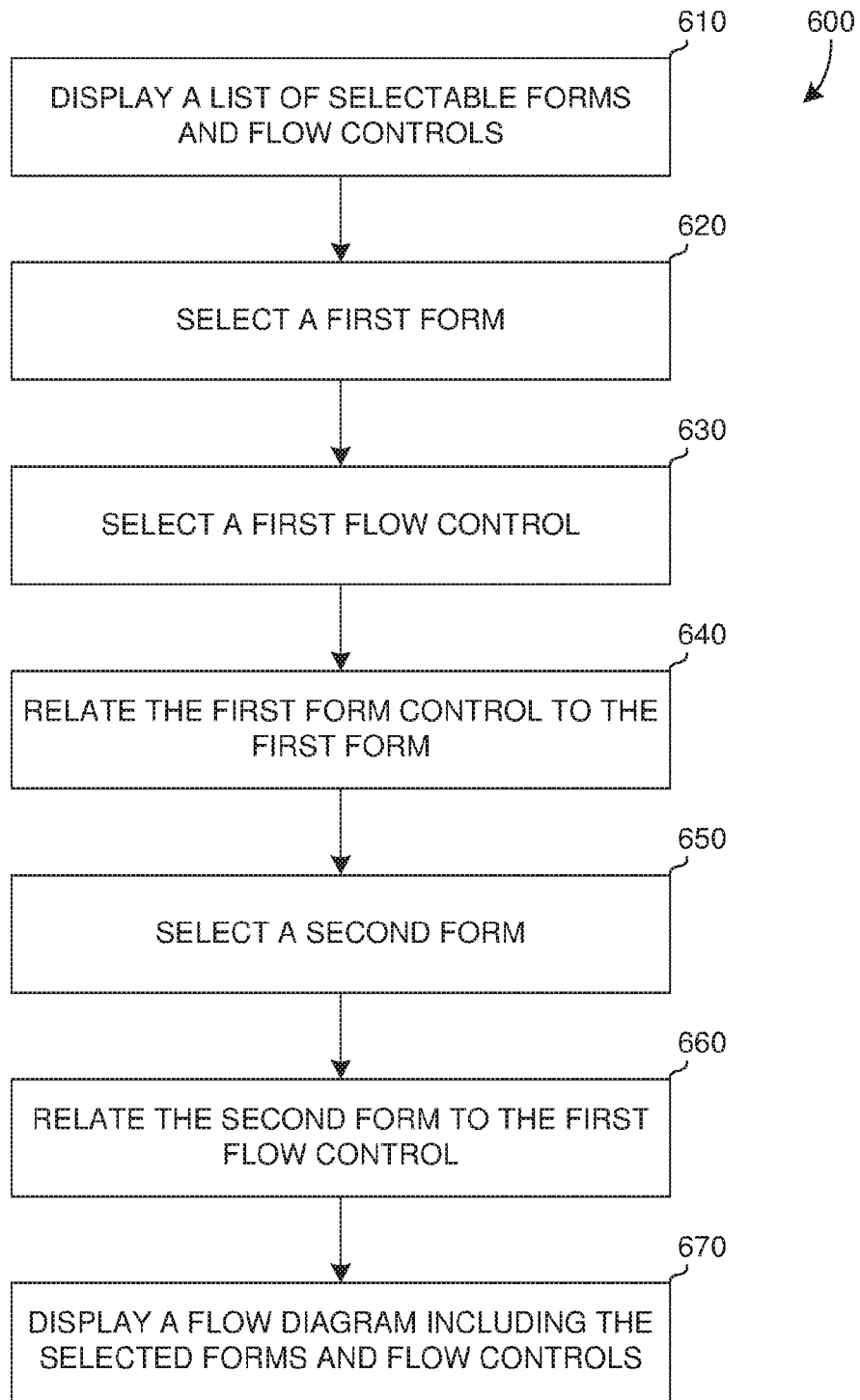
FIG. 8 is an example form creation process.

FIG. 8 depicts a process of the described form flow designer systems and methods. A list of selectable executable forms and flow controls are displayed 610 and a first form is selected from the list of forms 620. A first flow control is selected 630 and related to the first form 640. A second form can then be selected 650 and related to the first flow control 660. The completed form flow is displayed, showing the various selected forms and flow controls 670. When saved, the form flow is serialized and stored using XAML (however is not limited to XAML).

Figure 9:
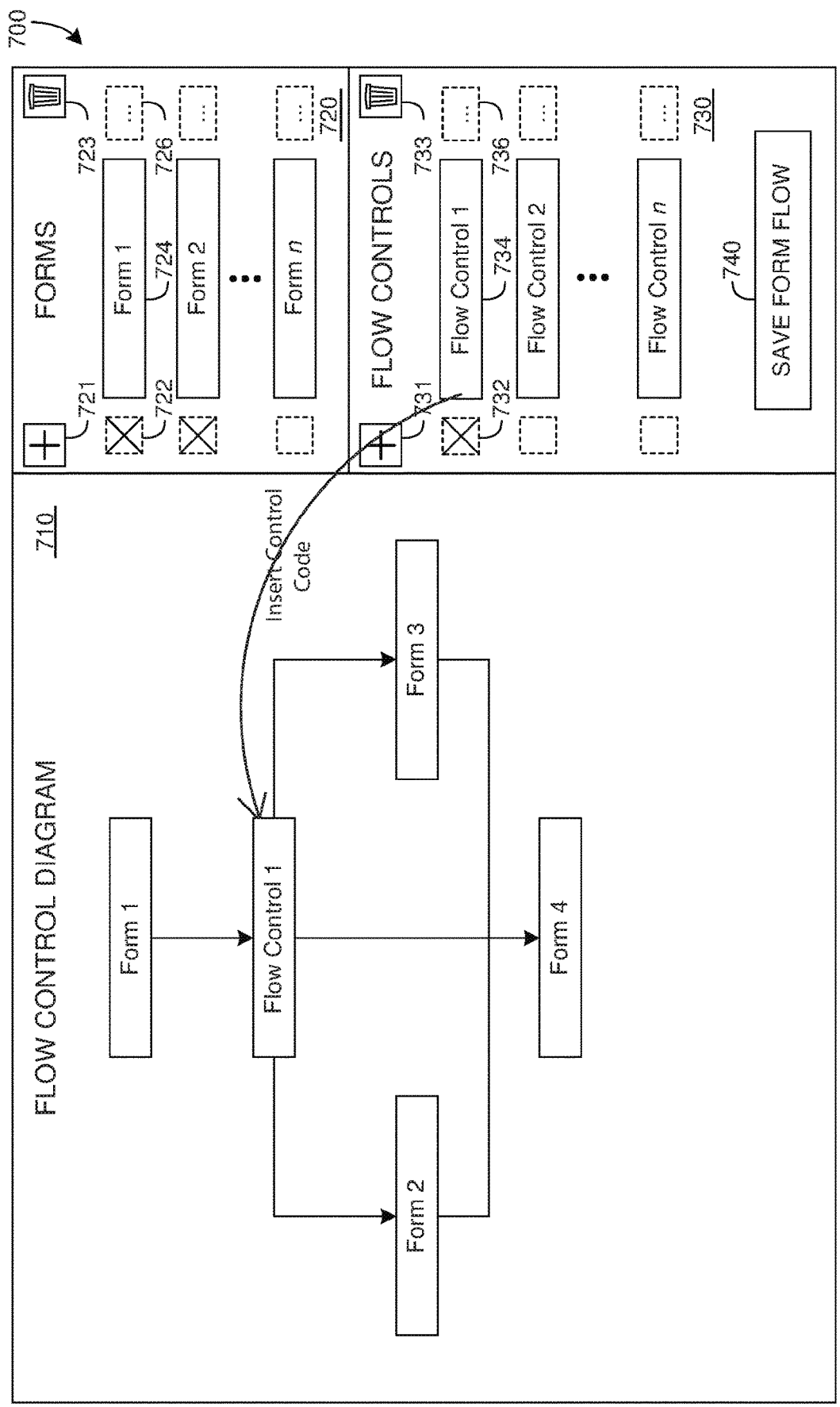
FIG. 9 is an example form flow creation interface.

FIG. 9 depicts a form flow designer. The form flow determines a sequence, order and/or arrangement or other configuration of a plurality of forms. The form flow can include flow elements such as "if" conditions, switch conditions, while loops, jump/goto statements, decision statements, confirmation messages and other flow elements. In an example flow, the form flow can function as logic statements that link various forms together in a variety of pathways and a user experiencing a singular pathway based on their interaction with the forms. In an example form flow, the form flow controls can function as logic statements that link various forms together in a variety of pathways, with a user experiencing a singular pathway based on their interaction with the forms. The form flow can result in non-singular flows as well where the user is given multiple choices.

The form flow code does not contain the code of the related forms. When requesting a process, the user device receives a form flow for that process. The form flow triggers the user device to request or retrieve selected forms based on the user's interaction with at least a previous form. If the user has limited server access, the form code can be stored on the user's device.

FIG. 9 shows that forms can be positioned on the graphical user interface. Just like with the form view interface, the forms in the flow designer can be moved into any order, copy and pasted, etc. The flow controls can be positioned between the forms, and can be moved to a different position as well. That is, when a flow control such as 734 is clicked, dragged or placed in the form flow designer user interface, code is inserted into the form flow. Edits can be made to the form flow since when the form flow is saved, the XAML code is serialized. Again, if changes after saving are desired, the XAML code will be deserialized and then later serialized.

Figure 10:
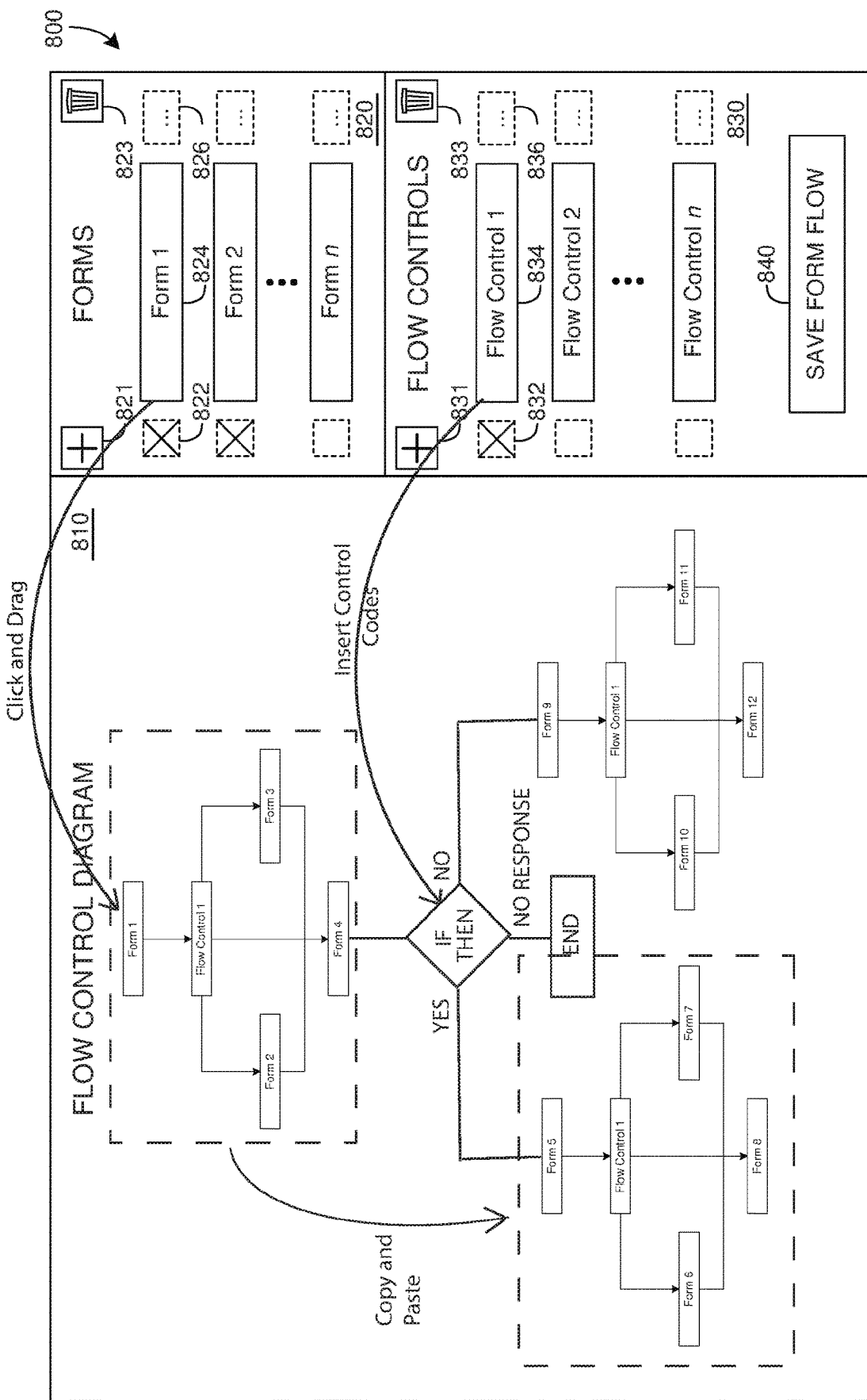
FIG. 10 is an example form flow creation process using the form flow creation features.

FIG. 10 is an example form flow creation process 800. A list of selectable forms and flow controls are displayed 810 and a first form is selected from the list of forms 820. A first flow control is selected 830 and related to the first form 840. A second form can then be selected 850 and related to the first flow control 860. The completed form flow is displayed, showing the various selected forms and flow controls 870.

Flow controls 834 are displayed in the flow controls window 830 and on the flow control diagram 810. The flow controls 834 are linked to associated forms as shown within the diagram 810. When the flow controls 834 are dragged to the flow form viewer, the flow controls are invoked which means that the form flow is executable. Similar to forms, when a user drags forms onto the form-flow designer, or flow elements (IF, WHILE, LOOP, JUMP, GOTO, etc.) these will be stored as serialized XAML in the form flow definition. The system will read the serialized form flow XAML and determine how to interpret each element in the form flow, and produce an executable system that follows the designed form-flow. As the form flow is executed, the form flow can call forms when certain form items are executed. Once the form flow is complete with the forms 824 and flow controls 834, the form flow can be saved or published to a server or other network location using the save form flow button 840.

Figure 11:
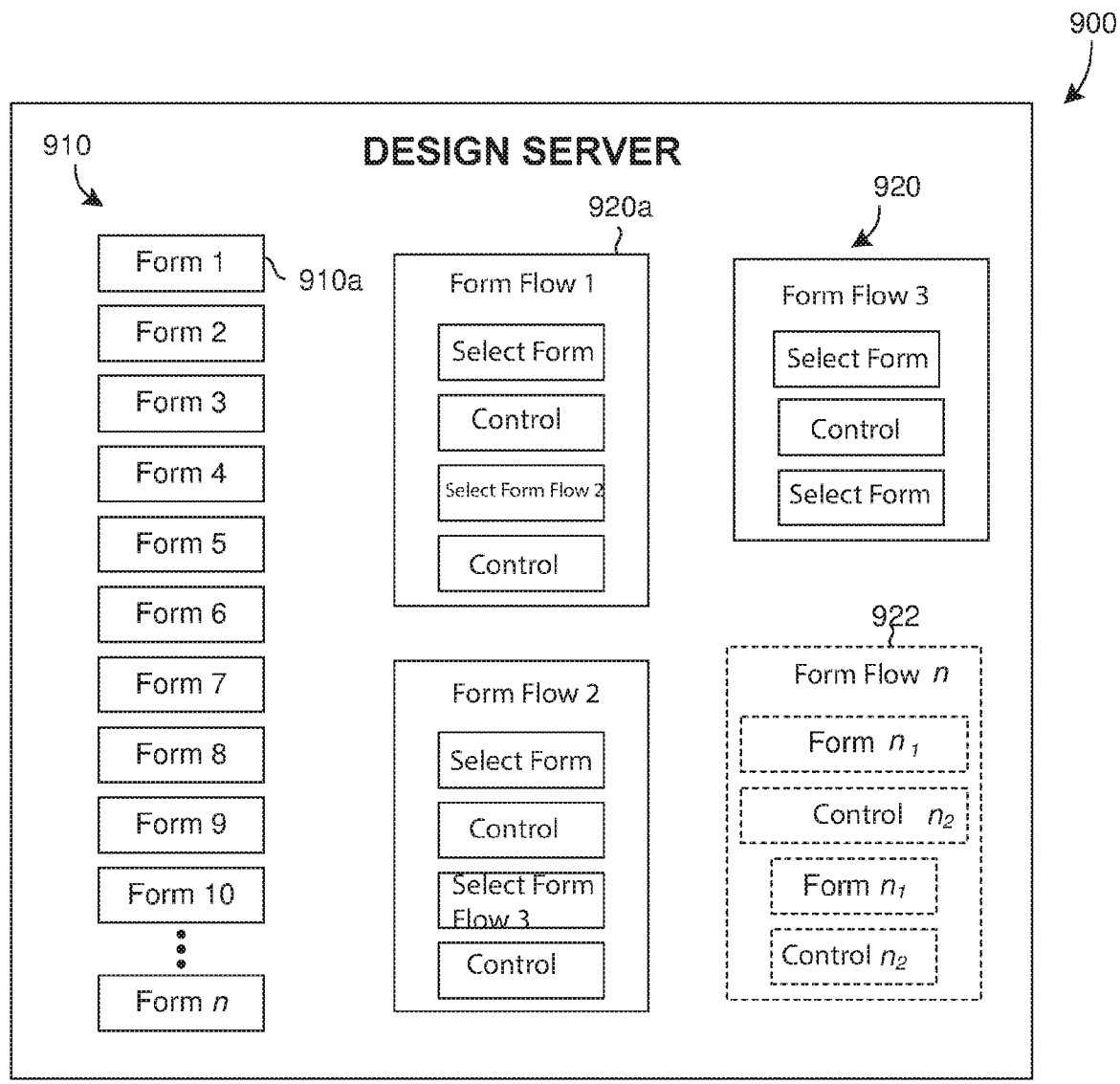
FIG. 11 is an example design server including example forms and form processes.

FIG. 11 is an example design server 900 that includes forms 910 and form flows 920. Business rules 930 can optionally be stored on the design server 900. As noted in FIGS. 1 and 2, the system configuration can include a plurality of remote servers. As discussed above, the forms 910 and the form flows 920 are stored separately from another within the server 900. Form flow 1 can select one or more forms from forms 910 and can select a different form flow, such as form flow 2. Various form flows can utilize the same forms. Form flow n is depicted to show that any form can be utilized within a form flow and control codes of the serialized XAML code link the forms so that the user can experience a seamless interaction with the forms.

Figure 12:
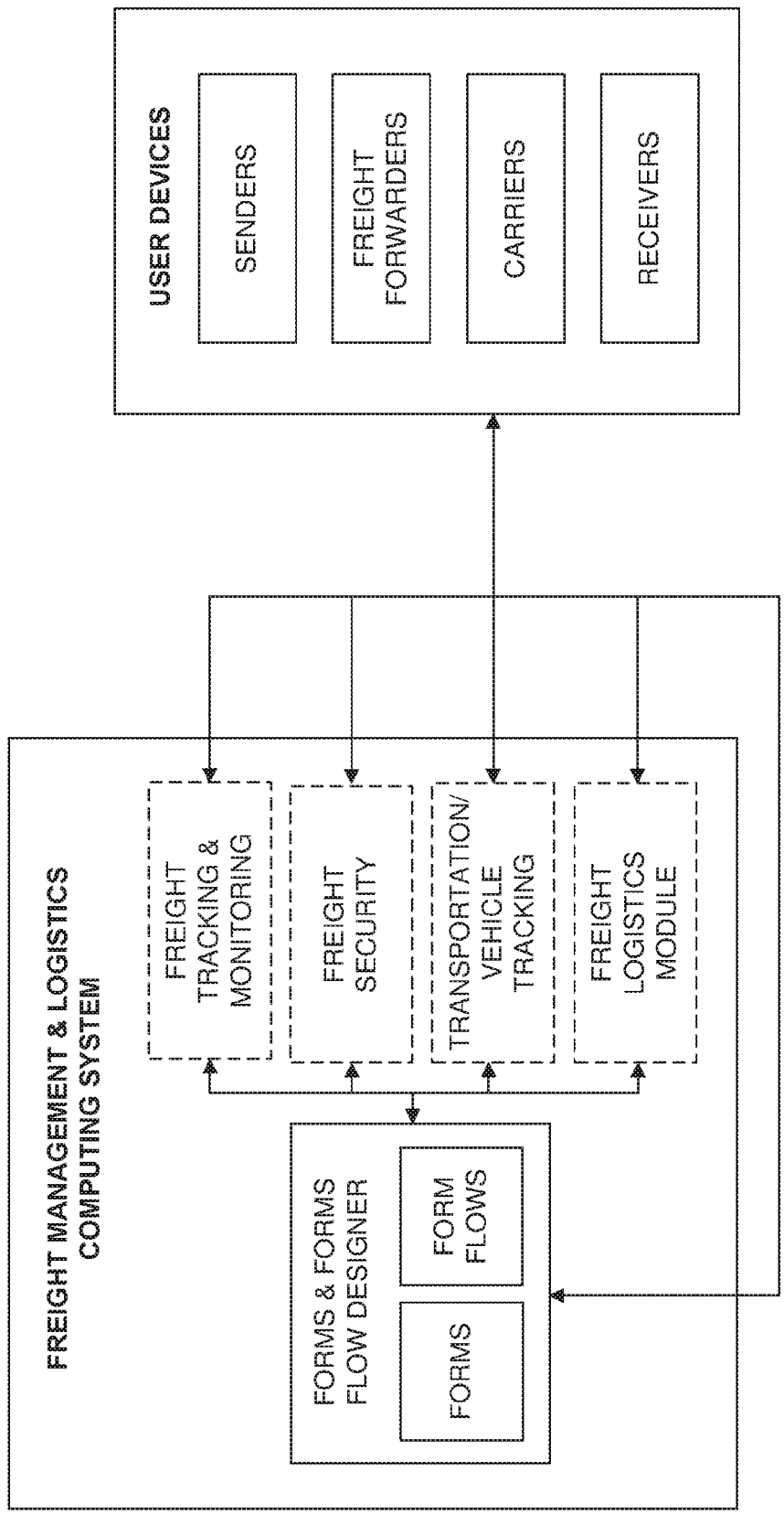
FIG. 12 is a use example of the disclosed systems and methods.

Referring to FIG. 12, many logistics systems, such as the proprietary WiseTech Global CargoWise One™ system, use a large number of forms to properly document and route cargo. Due to the international nature of the majority of cargo shipping, the forms can require frequent updates. Further, the integration of a logistics system with existing legacy systems can require unique customization of the logistics system for each customer. The use of the above described form creation and form control creation tools within a logistics system can allow customers or system suppliers to quickly and efficiently create and edit forms in response to regulatory changes. Further, the customizability of the forms and form controls can assist in the integration with existing or other customer systems. Customers can use the system supplied tool to create their own customized forms and flows.

The disclosed freight management system can include a freight forms database configured to store multiple executable freight forms each relating to an aspect of one or more freight shipments, each of the stored executable freight forms including one or more freight form items indicia selected by a user from multiple executable freight form items indicia representative of corresponding freight form items, the multiple executable freight form items indicia each displayed on a user device. The disclosed freight management system can also include a freight form flow process database configured to store multiple freight form flow processes, each of the stored freight form flow processes including respective freight form flow control that each invoke a selected freight flow control associated with one or more of the freight forms stored in the freight forms database. The disclosed freight management system can also include a freight management module configured, upon receiving a request from the user device, to receive at least one of the freight forms and the freight form flow processes and to transmit the received at least one of the freight forms and the freight form flow processes to the user device.

The disclosed freight management system can include a freight form database configured to store multiple executable freight forms, each of the stored executable freight forms including one or more freight form items indicia selected by a user from multiple freight form items indicia representative of corresponding freight form items, the stored freight forms each being executable and created based on instructions received from the user that include a selection of the one or more freight form items indicia. The disclosed freight management system can also include a freight form flow process database configured to store multiple freight form flow processes, each of the stored freight form flow processes including respective freight form flow control that when invoked provide a selected freight flow control associated with one or more of the freight forms stored in the freight forms database. Additionally it can include a freight tracking and monitoring module configured to access one or both of the freight forms database and the freight form flow process database, the freight tracking and monitoring module further configured to store and process data related to a first freight shipment, the freight shipment associated with one or both of a first freight form stored in the freight forms database and a first freight form flow process stored in the freight form flow process database, the freight tracking and monitoring module further configured to retrieve the first freight form from the freight forms database and the first freight form flow process from the freight form flow database.

A disclosed freight management system can include a freight form database configured to store multiple executable freight forms, each of the stored executable freight forms including one or more freight form items indicia selected by a user from multiple freight form items indicia representative of corresponding freight form items, the stored freight forms each being executable and created based on instructions received from the user that include a selection of the one or more freight form items indicia. It can also include a freight form flow process database configured to store multiple freight form flow processes, each of the stored freight form flow processes including respective freight form flow control that when invoked provide a selected freight flow control associated with one or more of the freight forms stored in the freight forms database. Furthermore, a disclosed freight management system can include a freight tracking and monitoring module configured to access one or both of the freight forms database and the freight form flow process database, the freight tracking and monitoring module further configured to store and process data related to a first freight shipment, the freight shipment associated with one or both of a first freight form stored in the freight forms database and a first freight form flow process stored in the freight form flow process database, the freight tracking and monitoring module further configured to retrieve the first freight form from the freight forms database and the first freight form flow process from the freight form flow database.

EXAMPLE

In one example, the disclosed methods and systems are implemented as a platform that provides product managers and business analysts with a set of tools or building blocks that let them, ie non-technical people, build entire business products/applications. Further, they can build these products once, and deploy to multiple different software and hardware platforms, including iOS, Android, Windows Phone, Windows CE, Windows, Mac and Linux.

The major tools or building blocks are:
Form Designer
Form-Flow Designer
Form and Form-Flow Configurator
Business Rule Designer
Business Test Designer
This example will, for each of the above areas, explain:
The purpose of the tool
Definitions of relevant terms
The design of the tool
An example of usage of the tool Form Designer Form Designer allows a business analyst to create a form that is then used as part of a product. A form is built by business analysts dragging the relevant data elements onto the form's surface. A form can also be known as a page, a surface, a portal, a web site, a dashboard or a surface. A form contains either actions (menus, buttons, tiles) and/or data elements (text-boxes, drop-downs, date-controls, grids, lists) and/or visualisation elements (charts, graphs, dashboards).

When a business analyst creates a new form, they first nominate the data or record type that they are designing for. At this point, data elements are automatically discovered and shown based on the data type of the form. These data elements are categorised into data categories such as Date/Time fields, String fields, Numeric fields, Related Lists, Related Records and Images. A business analyst can then drag on the relevant data element. Further, a business analyst can also drag on other visual elements such as panels and group-boxes to allow for a logical layout of their form. Internally, for each type of data element or control (panel/group-box), the platform has a representation of the programming code/markup that allows this control to be rendered in multiple platforms eXtensible Application Markup Language (XAML) for Windows Desktop Applications
JavaScript Object Notation (JSON) for Windows CE
HTML with KnockoutJS Binding for Web Browsers, iOS, Android and Windows Phone/Surface When multiple elements are dragged on to a surface, design server 220 creates an entire "file" that is the combination of those individual data elements and controls. Server 220 stores this file as part of the application as "data". This file is stored in a format that is platform neutral and represents the relevant information about the data element or control, including items such as:

The technical name of the data field that the element relates to
Layout settings including colours, margins, sizes and positions
Any control specific properties or options, such as whether a date control does or does not show the time element In other words, server 220 creates the forms in an intermediate language that can be transformed into device specific representation. When an individual device requests a specific form from the server, the server will understand what platform the client is using—and convert, on the fly, the stored form representation into the correct representation (XAML, JSON or HTML with KnockoutJS) and deliver the converted form to the client. The client application can then render this form as it is in a natively understood format.

Figure 13:
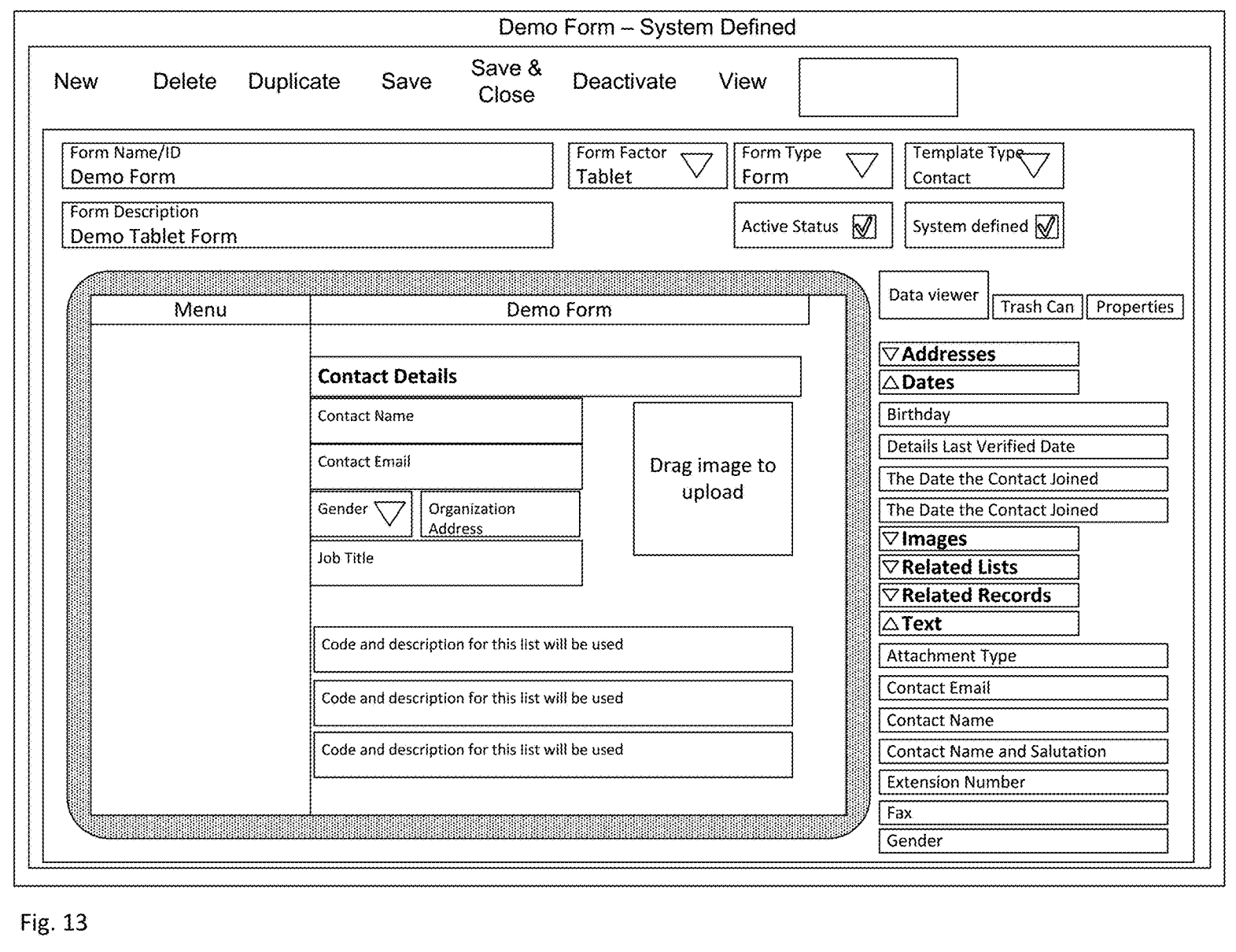

FIG. 13 shows an example of the form designer surface, with a few data elements and visual elements dragged on to the surface.

The below code shows the data representation, in Windows CE, XAML, JSON and HTML with KnockoutJS for a specific control—that being a "Textbox" control for display text/string information.

Windows CE

```
[
  {
    "type": "Label",
    "config": {
      "text": ~CaptionDetail~,
      "widthOverride": ~Width~,
```

-continued

```
        "height;": 15,
        "forFieldName": "~BindingPath~",
        "font": {
            "size": 8,
            "style": "bold"
        },
        "left": ~Left~,
        "top": ~Top~,
    }
},
{
    "type": "TextBox",
    "config": {
        "widthOverride": ~Width~,
        "heightOverride": ~Height~,
        "left": ~Left~,
        "top": ~Top~,
        "name": "~BindingPath~",
        "multiline": ~MultiLine~,
        "disabled": ~IsReadOnly~
    },
    "events": {
        "enterkeydown": {
            "action": {
                "method": "~OnSubmit~",
                "fields": [
                    {
                        "name": "~BindingPath~",
                        "source": "field"
                    }
                ]
            }
        }
    }
```

-continued

```
        }
    },
    "binding": {
        "name": "~BindingPath~"
    }
}
]
```

HTML with KnockoutJS

```
<label
    for="~ControlID~"
    data-caption-detail="~CaptionDetail~" />
<input
    id="~ControlID~"
    type="text" data-role="gwTextBox"
    data-property="~BindingPath~"
    data-margin="~Margin~"
    data-padding="~Padding~"
    data-maxlength="~MaxLength~"
    data-readonly="~IsReadOnly~"
    data-textwrapping="~TextWrapping~"
    data-initial-focus="~IsInitialFocus~"
    data-caption-position="~CaptionPosition~"
    data-font-weight="~FontWeight~"
    data-character-casing="~CharacterCasing~"
    data-design-control-id="~DesignControlID~"
    data-can-be-hidden="~CanBeHidden~" />
```

Windows Desktop (WPF XAML)

```
<TextBox
    xmlns="http://schemas.microsoft.com/winfx/2006/xaml/presentation"
    xmlns:x="http://schemas.microsoft.com/winfx/2006/xaml"
    xmlns:meta="clr-
namespace:CargoWise.Glow.UI.Infrastructure.MetaData;assembly=CargoWise.Glow
.UI.Infrastructure"
    xmlns:infra="clr-
namespace:CargoWise.Glow.UI.Infrastructure;assembly=CargoWise.Glow.UI.Infra
structure"
    xmlns:common="clr-
namespace:CargoWise.Glow.UI.Controls;assembly=CargoWise.Glow.UI.Controls"
        infra:DesignerExtension.ControlType="TXT"
        Text="{meta:MetaDataBinding ~BindingPath~, Mode=~BindingMode~}"
        Grid.ColumnSpan="{infra:PlaceholderValue ColumnSpan}"
        Grid.Column="{infra:PlaceholderValue Column}"
        Grid.RowSpan="{infra:PlaceholderValue RowSpan}"
        Grid.Row="{infra:PlaceholderValue Row}"
        infra:ControlStateExtensions.ReadOnly="{infra:PlaceholderValue
IsReadOnly}"
        Margin="{infra:PlaceholderValue Margin}"
        TextWrapping="{infra:PlaceholderValue TextWrapping}"
        FontWeight="{infra:PlaceholderValue Fontweight}"
        Style="{StaticResource InputTextBox}"
        infra:UIElementExtensions.CaptionPosition="{infra:PlaceholderValue
CaptionPosition}"
        infra:UIElementExtensions.ElementCaptionOverride="{infra:Placeholder
Value CaptionOverride, Converter={StaticResource
EmptyStringAsNullConverter}}"
        common:BPMDependencyProvider.SuppressDependencyContributions="{infra
:PlaceholderValue SuppressDependencyContributions}"
        >
    <infra:PlaceholderExtensions.Placeholders>
        <infra:PlaceholdersContainer>
            <infra:Placeholder Name="BindingPath" Value="~BindingPath~"
/>
            <infra:Placeholder Name="BindingMode" Value="~BindingMode~"
/>
            <infra:Placeholder Name="ColumnSpan" Value="~ColumnSpan~"
DefaultValue="4" />
            <infra:Placeholder Name="RowSpan" Value="~RowSpan~"
DefaultValue="1" />
            <infra:Placeholder Name="Column" Value="~Column~"
DefaultValue="0" />
            <infra:Placeholder Name="Row" Value="~Row~"
```

```
DefaultValue="0" />
        <infra:Placeholder Name="IsReadOnly" Value="~IsReadOnly~"
DefaultValue="False" />
        <infra:Placeholder Name="Margin" Value="~Margin~"
DefaultValue="0" />
        <infra:Placeholder Name="TextWrapping"
Value="~TextWrapping~" DefaultValue="NoWrap" />
        <infra:Placeholder Name="FontWeight" Value="~FontWeight~"
DefaultValue="Normal" />
        <infra:Placeholder Name="IsInitialFocus"
Value="~IsInitialFocus~" DefaultValue="False" />
        <infra:Placeholder Name="CaptionPosition"
Value="~CaptionPosition~" DefaultValue="Top" />
        <infra:Placeholder Name="CaptionOverride"
Value="~CaptionOverride~" />
        <infra:Placeholder Name="CanBeHidden" Value="~CanBeHidden~"
DefaultValue="True" />
        <infra:Placeholder Name="DesignControlID"
Value="~DesignControlID~" />
        <infra:Placeholder Name="SuppressDependencyConributions"
Value="~SuppressDependencyContributions~" DefaultValue="False" />
      </infra:PlaceholdersContainer>
    </infra:PlaceholderExtensions.Placeholders>
</TextBox>
```

Form-Flow Designer

The form flow designer allows a business analyst to create a flow of how a user should experience the system. Flow may be defined as the tasks that a user can complete for a specific operational purpose. The flow may contain sequential tasks, parallel, tasks, optional tasks and mandatory tasks. Some of these tasks may have a user interface, whilst some may be background tasks. When a business analyst defines a form-flow template, they are able to 'visually' (using drag and drop) build a flow-chart of how a user will experience the system. This includes the ability to:

Show a form, for data entry

Execute a background process, such as sending XML messages to a party on the job Ask the user a question in order to determine the next step Make an automatic decision based on a condition that is evaluated against the job's data Essentially, this allows non-technical resources to build an entire functional system program, that can be executed, without the need for technical coding.

This flow definition is stored in the database and can be retrieved by any client application via a web service call. The client applications (Windows Desktop, HTML, Windows CE etc) are able to then interpret this form flow definition, and perform the relevant tasks—such as showing a form to the user etc. Each client platform has an implementation of each of the task types, which is also referred to as an execution engine. This allows a single form-flow to be interpreted on any of these platforms without modification.

Figure 14:
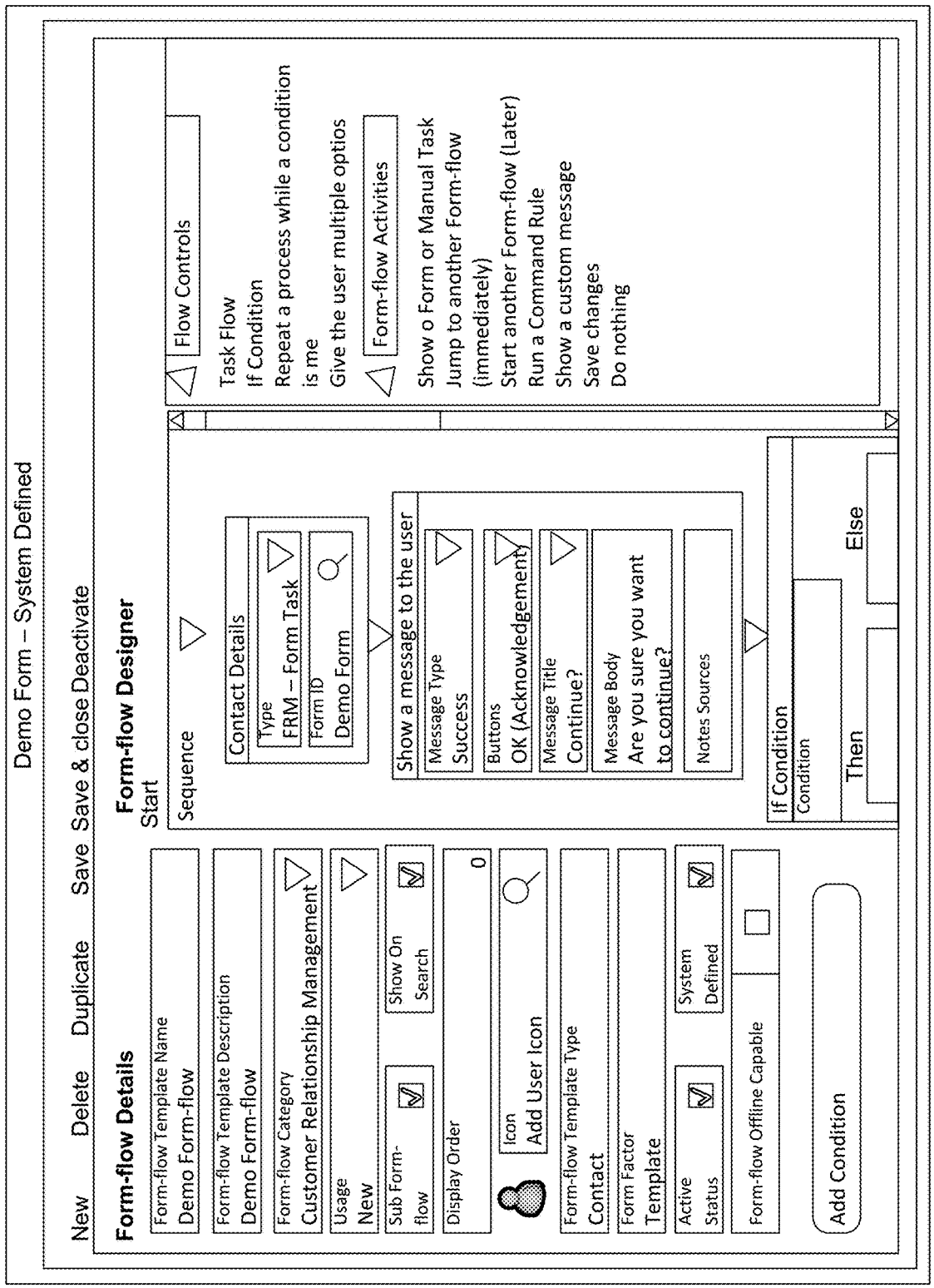
FIG. 14 shows an example of the form-flow designer surface.

FIG. 14 shows an example of the form-flow designer surface, with an example form-flow loaded.

Form and Form-Flow Configurator

The Form and Form-Flow Configurator allows a customer (end user) to configure forms and form-flows in their own system, to allow the system to be customised for their specific operations, or the specific operations of one part of their business, or even for a specific customer of theirs.

The Form Configurator controls how visual elements are displayed on a form: position, visibility (hidden/visible), and contents of certain elements, such as drop-down lists. Form-Flow Configurator allows to exclude certain parts of a form-flow that may not be applicable to a specific part of the business or a specific customer. Configuration Templates group configured items together by various parameters, such as Customer, Company, Branch, or Department. This allows users to specify the level at which a configuration template applies.

When a business analyst designs a form, he or she decides on a layout that works for the majority of users. The analyst indicates which visual elements are required, and which can be hidden by the user configuring the form. It is also possible to specify a list of additional elements that can be added to the form layout during configuration. This way the form layout can be changed within pre-defined constraints, maintaining supportability of the product. Additionally, the choices available within drop-down lists and search controls can be removed during configuration, so that only the items relevant to an area of business or a specific customer are displayed.

A form-flow may be designed to have multiple next steps, asking the user to make a selection. During form-flow configuration, some steps may be disabled, making it easier for the user to select a relevant step during run-time. Configuration Templates contain all of the above Configuration Items. A configuration template may be:

Default: applies to all users

Customer-specific: applies to users that belong to a specific customer

Company/Branch/Department-specific: applies to users that belong to a specific company, branch, or department Internally, configuration items are stored in the way that is most suitable for the type of item:

Form layout: the XAML of the configured form is stored.

List items: the excluded items are stored as XML.

Form-flow steps: the disabled steps are stored as XML.

Configuration item data format can be extended to store additional configuration types.

FIG. 15 shows a form-flow in configuration mode. In this example, the user removed several fields from a panel, disabled a form-flow step, and is about to move a panel around the form.

FIG. 16 demonstrates how a search control can be configured to exclude items that are irrelevant for a specific configuration.

The steps above may be performed by modules or other means within a corresponding computer system. This includes software means such as functions, classes, code files, libraries or objects as well as service means including middleware services connected by a message passing architecture. In other examples, means include hardware means, such as virtual machines, web servers, ASICs, FPGAs, CPUs and GPUs.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method comprising:
on a server, storing a form flow process file, the form flow process file configured to provide access to form files, to determine an order or sequence of multiple forms that defines a logical pathway by which one or more of the related forms are accessed, and being interpretable by multiple different platforms without modification;
receiving at the server, a request from a device for the form flow process file;
transmitting the form flow process file to the device;
receiving a request of a form file from the logical pathway by which the one or more of the related forms are accessed based upon the transmitted form flow process file and an indication of a rendering language of the device transmitting the request; and
transmitting the form file in the rendering language of the device making the request, the form file independent from the form flow process file that defines the logical pathway by which the one or more of the related forms are accessed.

2. The method of claim 1 further comprising receiving an indication of a form factor of a device making the request.

3. The method of claim 2, wherein the transmitted form file is configured for rendering in accordance with the form factor of the device making the request.

4. A method of a device having a form factor and a display, wherein device operates in accordance with a rendering language native to the device, comprising:
at the device, receiving instruction to request a form file;
transmitting a request to a remote server, the request for a form flow process file which is configured to provide access the form file, to determine an order or sequence of multiple forms that defines a logical pathway by which one or more of the related forms are accessed, and being interpretable by multiple different platforms without modification;
receiving the form flow process file from the server;
transmitting a request of a form file from the logical pathway by which the one or more of the related forms are accessed based upon the transmitted form flow process file and an indication of a rendering language of the device transmitting the request; and
receiving the form file in the rendering language of the device making the request, the form file independent from the form flow process file that defines the logical pathway by which the one or more of the related forms are accessed.

5. A method comprising:
on a server, storing form flow process file configured to provide access to a form file, to determine an order or sequence of multiple forms that defines a logical pathway by which one or more of the related forms are accessed, and being interpretable by multiple different platforms without modification;
on the server, storing the form file, the form file configured in a first rendering language;
receiving at the server, a request from a device having access to the form flow process file, the request for the form file from the logical pathway by which the one or more of the related forms are accessed and an indication of the rendering language requirements of the device; and
at the server, determining whether the first rendering language meets the rendering language requirements of the device;
if the first rendering language does meets the rendering language requirements of the device, transmitting the form in the first rendering language.

6. The method of claim 5 wherein if the file does not meet the rendering language requirements of the device, at the server, converting the form file into the rendering language requirements of the device and transmitting the converted form file.

7. The method of claim 6, wherein converting the form file into the rendering language requirements of the device is processed in accordance with a mapping between the first rendering language to the rendering language of the device.

8. The method of claim 5 receiving at the server an indication of the form factor of the device.

9. The method of claim 5, transmitting the form file so that it is configured for the form factor of the device.

10. A method comprising:
at a server, storing an executable content flow process file and an associated executable content file in a first rendering language, the content flow process file configured to provide access to form files, to determine an order or sequence of multiple forms that defines a logical pathway by which one or more of the related forms are accessed, and being interpretable by multiple different platforms without modification;
receiving a request from a remote device to transmit an executable content flow process file;
transmitting the executable content flow process file;
at the server, receiving a request for the associated executable content file of the executable content flow process file from the logical pathway by which the one or more of the related forms are accessed, the request including an indication of the rendering language of the remote device;
at the server, converting the executable content file from the first rendering language to a the rendering language of the remote to generate a converted executable content file for use on the graphical user interface of the remote device; and at the server, transmitting the converted executable content file.

11. The method of claim 10 further comprising receiving an indication of a form factor of a device making the request.

12. The method of claim 11 wherein the converted executable content file is provided for the form factor of the device making the request.

* * * * *

UNITED STATES PATENT AND TRADEMARK OFFICE
CERTIFICATE OF CORRECTION

PATENT NO. : 11,113,457 B2
APPLICATION NO. : 15/749102
DATED : September 7, 2021
INVENTOR(S) : Richard White et al.

It is certified that error appears in the above-identified patent and that said Letters Patent is hereby corrected as shown below:

On the Title Page

Item [57], Lines 9-10, delete "rending language" and insert -- rendering language --, therefor.

In the Claims

In Column 20, Claim 10, Line 64, delete "a the rendering language of the remote to" and insert -- the rendering language of the remote device to --, therefor.

Signed and Sealed this
Sixteenth Day of January, 2024

Katherine Kelly Vidal
*Director of the United States Patent and Trademark Office*